US010535114B2

(12) United States Patent
Bolz

(10) Patent No.: US 10,535,114 B2
(45) Date of Patent: Jan. 14, 2020

(54) CONTROLLING MULTI-PASS RENDERING SEQUENCES IN A CACHE TILING ARCHITECTURE

(71) Applicant: NVIDIA CORPORATION, Santa Clara, CA (US)

(72) Inventor: Jeffrey A. Bolz, Cedar Park, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 361 days.

(21) Appl. No.: 14/829,617

(22) Filed: Aug. 18, 2015

(65) Prior Publication Data
US 2017/0053375 A1    Feb. 23, 2017

(51) Int. Cl.
| G06T 1/20 | (2006.01) |
| G09G 5/39 | (2006.01) |
| G09G 5/02 | (2006.01) |
| G09G 5/14 | (2006.01) |
| G09G 5/36 | (2006.01) |
| G06T 11/40 | (2006.01) |

(52) U.S. Cl.
CPC ............... G06T 1/20 (2013.01); G06T 11/40 (2013.01); G09G 5/026 (2013.01); G09G 5/14 (2013.01); G09G 5/363 (2013.01); G09G 5/39 (2013.01); *G09G 2360/122* (2013.01); *G09G 2370/10* (2013.01)

(58) Field of Classification Search
CPC . G06T 1/20; G06T 1/60; G06F 1/3203; G06F 9/4893; G09G 5/026; G09G 5/14; G09G 5/363; G09G 5/39; G09G 2360/122; G09G 2370/10
See application file for complete search history.

(56) References Cited

U.S. PATENT DOCUMENTS

| 5,204,916 A | * | 4/1993 | Hamilton, Jr. | ........ G06T 3/0006 358/3.07 |
| 5,463,720 A | * | 10/1995 | Granger | ............... H04N 1/4058 358/1.9 |
| 5,500,933 A | * | 3/1996 | Schnorf | .................. G06T 11/60 345/632 |

(Continued)

*Primary Examiner* — Devona E Faulk
*Assistant Examiner* — Charles L Beard
(74) *Attorney, Agent, or Firm* — Artegis Law Group, LLP

(57) ABSTRACT

In one embodiment of the present invention a driver configures a graphics pipeline implemented in a cache tiling architecture to perform dynamically-defined multi-pass rendering sequences. In operation, based on sequence-specific configuration data, the driver determines an optimized tile size and, for each pixel in each pass, the set of pixels in each previous pass that influence the processing of the pixel. The driver then configures the graphics pipeline to perform per-tile rendering operations in a region that is translated by a pass-specific offset backward—vertically and/or horizontally—along a tiled caching traversal line. Notably, the offset ensures that the required pixel data from previous passes is available. The driver further configures the graphics pipeline to store the rendered data in cache lines. Advantageously, the disclosed approach exploits the efficiencies inherent in cache tiling architecture while honoring highly configurable data dependencies between passes in multi-pass rendering sequences.

20 Claims, 11 Drawing Sheets

(56) References Cited

U.S. PATENT DOCUMENTS

| | | | | |
|---|---|---|---|---|
| 5,535,393 A * | 7/1996 | Reeve | G06F 8/45 | 712/10 |
| 5,729,672 A * | 3/1998 | Ashton | G06T 15/06 | 345/419 |
| 5,736,988 A * | 4/1998 | Shaw | G06T 1/60 | 345/423 |
| 5,819,278 A * | 10/1998 | Hamburg | G06T 11/00 | |
| 6,141,446 A * | 10/2000 | Boliek | H03M 7/30 | 375/240.11 |
| 6,232,932 B1 * | 5/2001 | Thorner | G06F 1/1601 | 345/1.3 |
| 6,313,846 B1 * | 11/2001 | Fenney | G06T 15/04 | 345/552 |
| 6,476,807 B1 * | 11/2002 | Duluk, Jr. | G06T 1/60 | 345/421 |
| 6,552,723 B1 * | 4/2003 | Duluk, Jr. | G06T 1/60 | 345/419 |
| 6,636,215 B1 * | 10/2003 | Greene | G06T 15/405 | 345/422 |
| 6,646,639 B1 * | 11/2003 | Greene | G06T 15/005 | 345/422 |
| 6,667,745 B1 * | 12/2003 | Hussain | G06F 12/0207 | 345/545 |
| 6,697,063 B1 * | 2/2004 | Zhu | G06T 15/005 | 345/421 |
| 7,102,646 B1 * | 9/2006 | Rubinstein | G06T 15/005 | 345/543 |
| 7,170,515 B1 * | 1/2007 | Zhu | G06T 15/005 | 345/422 |
| 7,466,318 B1 * | 12/2008 | Kilgard | G06T 15/04 | 345/552 |
| 7,492,368 B1 * | 2/2009 | Nordquist | G06F 13/161 | 345/502 |
| 7,545,382 B1 * | 6/2009 | Montrym | G06T 1/60 | 345/530 |
| 7,649,538 B1 * | 1/2010 | Minkin | G06T 1/60 | 345/428 |
| 7,969,444 B1 * | 6/2011 | Biermann | G06T 15/04 | 345/502 |
| 8,074,210 B1 * | 12/2011 | Jones | G06F 17/16 | 717/151 |
| 8,085,264 B1 * | 12/2011 | Crow | G06T 15/005 | 345/419 |
| 8,271,734 B1 * | 9/2012 | Glasco | G06F 12/084 | 345/546 |
| 8,488,890 B1 * | 7/2013 | McAllister | H04N 19/96 | 382/232 |
| 8,508,544 B1 * | 8/2013 | Molnar | G06T 9/00 | 345/422 |
| 8,532,383 B1 * | 9/2013 | Thakkar | G06T 1/00 | 382/173 |
| 8,537,168 B1 * | 9/2013 | Steiner | G06T 15/005 | 345/506 |
| 8,553,041 B1 * | 10/2013 | Danskin | G06T 15/005 | 345/530 |
| 8,605,102 B1 * | 12/2013 | Purcell | G06T 15/005 | 345/530 |
| 8,615,770 B1 * | 12/2013 | Stratton | G06F 9/4843 | 718/100 |
| 8,670,613 B2 * | 3/2014 | McAllister | G09G 5/02 | 382/166 |
| 8,698,811 B1 * | 4/2014 | Crow | G06T 11/40 | 345/419 |
| 8,704,826 B1 * | 4/2014 | Hakura | G06T 17/20 | 345/419 |
| 8,704,836 B1 * | 4/2014 | Rhoades | G06T 15/005 | 345/502 |
| 8,711,167 B2 * | 4/2014 | Wyatt | G09G 3/003 | 345/102 |
| 8,751,771 B2 * | 6/2014 | Fahs | G06F 9/30036 | 711/154 |
| 8,760,455 B2 * | 6/2014 | Duluk, Jr. | G06T 1/20 | 345/505 |
| 8,773,447 B1 * | 7/2014 | Donham | G06T 15/005 | 345/421 |
| 8,959,497 B1 * | 2/2015 | Stratton | G06F 8/456 | 717/140 |
| 9,053,127 B2 * | 6/2015 | Sample | G09B 29/003 | |
| 9,123,173 B2 * | 9/2015 | Legakis | G06T 11/40 | |
| 9,218,793 B2 * | 12/2015 | Kakarlapudi | G09G 5/377 | |
| 9,239,795 B2 * | 1/2016 | Agarwal | G06F 12/12 | |
| 9,299,312 B2 * | 3/2016 | Wyatt | G09G 5/006 | |
| 9,323,774 B2 * | 4/2016 | Dally | G06F 17/30153 | |
| 9,342,891 B2 * | 5/2016 | Kilgard | G06T 7/0079 | |
| 9,355,483 B2 * | 5/2016 | Lum | G06T 11/40 | |
| 9,390,464 B2 * | 7/2016 | Amsinck | G06T 1/60 | |
| 9,454,843 B2 * | 9/2016 | Rouet | G06T 15/405 | |
| 9,571,846 B2 * | 2/2017 | Millet | H04N 19/423 | |
| 9,679,356 B2 * | 6/2017 | Metcalfe | G06T 3/4007 | |
| 9,734,548 B2 * | 8/2017 | Hakura | G06T 1/60 | |
| 9,779,533 B2 * | 10/2017 | Dimitrov | G06T 15/005 | |
| 9,784,589 B1 * | 10/2017 | Gyenes | G01C 21/3461 | |
| 10,019,776 B2 * | 7/2018 | Hakura | G06T 11/40 | |
| 10,032,245 B2 * | 7/2018 | Hakura | G06T 11/40 | |
| 10,055,806 B2 * | 8/2018 | Hakura | G06T 11/40 | |
| 10,331,837 B1 * | 6/2019 | McEwen | G06F 17/5072 | |
| 2002/0085010 A1 * | 7/2002 | McCormack | G06T 11/40 | 345/545 |
| 2002/0149596 A1 * | 10/2002 | Champion | G06T 1/60 | 345/545 |
| 2004/0125111 A1 * | 7/2004 | Tang-Petersen | G06T 15/005 | 345/506 |
| 2004/0177155 A1 * | 9/2004 | Enokida | G06T 9/007 | 709/236 |
| 2004/0231000 A1 * | 11/2004 | Gossalia | G06T 1/60 | 725/132 |
| 2006/0044317 A1 * | 3/2006 | Bourd | G06T 1/60 | 345/557 |
| 2006/0098229 A1 * | 5/2006 | Matsunaga | G06T 1/20 | 358/2.1 |
| 2007/0083730 A1 * | 4/2007 | Vorbach | G06F 9/3897 | 712/10 |
| 2007/0195113 A1 * | 8/2007 | Walton | G06T 3/606 | 345/649 |
| 2007/0242070 A1 * | 10/2007 | Crow | G06T 1/60 | 345/441 |
| 2007/0296824 A1 * | 12/2007 | Paine | G06T 3/4038 | 348/222.1 |
| 2008/0055325 A1 * | 3/2008 | Seigneret | G09G 5/39 | 345/538 |
| 2008/0094407 A1 * | 4/2008 | Xu | G06T 1/60 | 345/552 |
| 2008/0109327 A1 * | 5/2008 | Mayle | G06Q 30/0603 | 705/27.1 |
| 2008/0111821 A1 * | 5/2008 | Arora | H04N 5/232 | 345/520 |
| 2008/0150937 A1 * | 6/2008 | Lundstrom | G06T 15/08 | 345/419 |
| 2008/0165200 A1 * | 7/2008 | Chow | G06F 3/14 | 345/531 |
| 2008/0292216 A1 * | 11/2008 | Walker | G06T 1/00 | 382/298 |
| 2008/0292219 A1 * | 11/2008 | Keall | H04N 5/357 | 382/313 |
| 2009/0002379 A1 * | 1/2009 | Baeza | G06T 1/20 | 345/522 |
| 2009/0122064 A1 * | 5/2009 | Diril | G06T 11/40 | 345/428 |
| 2009/0174706 A1 * | 7/2009 | Howson | G06T 1/20 | 345/419 |
| 2010/0053427 A1 * | 3/2010 | Naka | H04N 7/012 | 348/450 |
| 2010/0095173 A1 * | 4/2010 | Rahman | G01R 31/318547 | 714/729 |
| 2010/0123907 A1 * | 5/2010 | Edgar | G06K 9/00483 | 358/1.5 |
| 2011/0148919 A1 * | 6/2011 | Heggelund | G06T 1/20 | 345/629 |

(56) References Cited

U.S. PATENT DOCUMENTS

| | | | |
|---|---|---|---|
| 2011/0238948 A1* | 9/2011 | Vorbach | G06F 15/7867 712/15 |
| 2011/0261061 A1* | 10/2011 | Lees | G06T 1/20 345/501 |
| 2011/0285735 A1* | 11/2011 | Bolz | G06T 11/203 345/582 |
| 2011/0292032 A1* | 12/2011 | Yang | G06T 15/005 345/419 |
| 2012/0176386 A1* | 7/2012 | Hutchins | G06T 1/20 345/522 |
| 2012/0206447 A1* | 8/2012 | Hutchins | G06T 15/005 345/419 |
| 2012/0268465 A1* | 10/2012 | Inada | G06T 11/00 345/428 |
| 2012/0293519 A1* | 11/2012 | Ribble | G06T 15/005 345/501 |
| 2013/0132684 A1* | 5/2013 | Ostrovsky | G06F 11/3471 711/147 |
| 2013/0135351 A1* | 5/2013 | Tripathi | G06T 3/606 345/649 |
| 2013/0148019 A1* | 6/2013 | Wu | H04N 7/0117 348/453 |
| 2013/0155103 A1* | 6/2013 | Kakarlapudi | G09G 5/377 345/629 |
| 2013/0176211 A1* | 7/2013 | Inada | G06T 1/60 345/156 |
| 2013/0182774 A1* | 7/2013 | Wang | H04N 19/46 375/240.24 |
| 2013/0249897 A1* | 9/2013 | Dunaisky | G06T 5/002 345/419 |
| 2013/0265298 A1* | 10/2013 | Moon | G06T 15/00 345/419 |
| 2013/0307859 A1* | 11/2013 | Johnson | G06T 1/60 345/501 |
| 2013/0321471 A1* | 12/2013 | Fink | G09G 5/393 345/666 |
| 2013/0326158 A1* | 12/2013 | Chen | G06F 12/0607 711/148 |
| 2013/0328889 A1* | 12/2013 | Chen | G06T 1/60 345/501 |
| 2014/0015843 A1* | 1/2014 | Bolz | G06T 9/00 345/545 |
| 2014/0071463 A1* | 3/2014 | Achiwa | G06K 15/1861 358/1.5 |
| 2014/0118347 A1* | 5/2014 | Hakura | G06T 15/005 345/422 |
| 2014/0118352 A1* | 5/2014 | Hakura | G06F 9/44 345/426 |
| 2014/0118364 A1* | 5/2014 | Hakura | G06T 11/40 345/505 |
| 2014/0118373 A1* | 5/2014 | Hakura | G06T 15/005 345/545 |
| 2014/0118379 A1* | 5/2014 | Hakura | G06T 1/60 345/557 |
| 2014/0118393 A1* | 5/2014 | Hakura | G06T 15/005 345/628 |
| 2014/0176579 A1* | 6/2014 | Duluk, Jr. | G06T 1/20 345/506 |
| 2014/0184616 A1* | 7/2014 | Gupta | G06F 11/277 345/505 |
| 2014/0198119 A1* | 7/2014 | Seetharamaiah | G06T 11/40 345/581 |
| 2014/0218390 A1* | 8/2014 | Rouet | G06T 15/405 345/612 |
| 2014/0237187 A1* | 8/2014 | Dimitrov | G06F 12/0897 711/122 |
| 2014/0247876 A1* | 9/2014 | Moriya | H04N 19/00951 375/240.12 |
| 2014/0253555 A1* | 9/2014 | Lum | G06T 15/005 345/428 |
| 2014/0267224 A1* | 9/2014 | Lum | G06T 15/005 345/419 |
| 2014/0267232 A1* | 9/2014 | Lum | G06T 17/00 345/419 |
| 2014/0267259 A1* | 9/2014 | Frascati | G06T 15/005 345/423 |
| 2014/0267356 A1* | 9/2014 | Minkin | G06T 5/002 345/589 |
| 2014/0267366 A1* | 9/2014 | Bolz | G06T 11/203 345/593 |
| 2014/0267375 A1* | 9/2014 | Kilgard | G06T 7/0079 345/611 |
| 2014/0267376 A1* | 9/2014 | Bolz | G06T 11/40 345/612 |
| 2014/0267377 A1* | 9/2014 | Halstvedt | G06T 11/40 345/613 |
| 2014/0267386 A1* | 9/2014 | Bolz | G06T 15/30 345/620 |
| 2014/0270551 A1* | 9/2014 | Baranowski | G06K 9/6285 382/226 |
| 2014/0300619 A1* | 10/2014 | Hasselgren | G06T 15/005 345/589 |
| 2014/0306971 A1* | 10/2014 | Frascati | G06T 11/40 345/522 |
| 2014/0320512 A1* | 10/2014 | Seetharamaiah | G06T 15/005 345/564 |
| 2014/0368521 A1* | 12/2014 | Lassen | G06T 1/60 345/552 |
| 2015/0012705 A1* | 1/2015 | Holmqvist | G06F 12/0886 711/118 |
| 2015/0035853 A1* | 2/2015 | Kaburlasos | G06T 1/00 345/619 |
| 2015/0042667 A1* | 2/2015 | Poddar | G09G 5/14 345/531 |
| 2015/0042669 A1* | 2/2015 | Van Nostrand | G09G 5/395 345/545 |
| 2015/0046655 A1* | 2/2015 | Nystad | G06F 12/0815 711/125 |
| 2015/0049104 A1* | 2/2015 | Lum | G06T 15/04 345/552 |
| 2015/0054836 A1* | 2/2015 | Bolz | G06T 11/40 345/505 |
| 2015/0062154 A1* | 3/2015 | Ellis | G06T 11/40 345/619 |
| 2015/0070380 A1* | 3/2015 | Lum | G06T 15/005 345/612 |
| 2015/0070381 A1* | 3/2015 | Lum | G06T 15/503 345/612 |
| 2015/0089151 A1* | 3/2015 | Bolz | G06F 12/0815 711/141 |
| 2015/0154733 A1* | 6/2015 | Amsinck | G06T 1/60 345/545 |
| 2015/0187117 A1* | 7/2015 | Balci | G06T 1/20 345/522 |
| 2015/0193903 A1* | 7/2015 | Agarwal | G06F 12/12 345/506 |
| 2015/0193907 A1* | 7/2015 | Agarwal | G06T 1/60 345/557 |
| 2015/0213638 A1* | 7/2015 | Dimitrov | G06T 15/005 345/619 |
| 2015/0302545 A1* | 10/2015 | Harris | G06T 1/20 345/501 |
| 2015/0302546 A1* | 10/2015 | Balci | G06T 1/20 345/522 |
| 2015/0379663 A1* | 12/2015 | Gruber | G06T 1/20 345/522 |
| 2016/0035129 A1* | 2/2016 | Bolz | G06T 15/005 345/420 |
| 2016/0055608 A1* | 2/2016 | Frascati | G06T 1/20 345/522 |
| 2016/0080833 A1* | 3/2016 | Denoual | H04N 21/234327 725/116 |
| 2016/0088300 A1* | 3/2016 | Frishman | H04N 19/124 375/240.03 |
| 2016/0105690 A1* | 4/2016 | Denoual | H04N 19/46 375/240.02 |
| 2016/0150241 A1* | 5/2016 | Hirabayashi | H04N 21/8456 375/240.21 |

(56) References Cited

U.S. PATENT DOCUMENTS

| | | | |
|---|---|---|---|
| 2016/0182927 A1* | 6/2016 | Denoual | H04N 21/234345 |
| | | | 725/109 |
| 2016/0210724 A1* | 7/2016 | Taylor | G06T 1/20 |
| 2016/0232645 A1* | 8/2016 | Wang | G06F 9/50 |
| 2016/0274679 A1* | 9/2016 | Romano | G06F 3/0317 |
| 2016/0350965 A1* | 12/2016 | Lum | G06T 15/005 |
| 2016/0364900 A1* | 12/2016 | Seiler | G06T 11/001 |
| 2016/0364901 A1* | 12/2016 | Balci | G06T 1/20 |
| 2017/0076418 A1* | 3/2017 | Son | G06T 1/20 |
| 2017/0084055 A1* | 3/2017 | Kwon | G06T 15/04 |
| 2017/0091897 A1* | 3/2017 | Lee | G06T 1/20 |
| 2017/0098294 A1* | 4/2017 | Kim | G06T 15/005 |
| 2017/0116698 A1* | 4/2017 | Hakura | G06T 11/40 |
| 2017/0116699 A1* | 4/2017 | Hakura | G06T 11/40 |
| 2017/0116700 A1* | 4/2017 | Hakura | G06T 11/40 |
| 2017/0134736 A1* | 5/2017 | Hirabayashi | H04N 5/76 |
| 2017/0139707 A1* | 5/2017 | Jang | G06F 9/3012 |
| 2017/0148203 A1* | 5/2017 | Hakura | G06T 15/005 |
| 2017/0148204 A1* | 5/2017 | Hakura | G06T 15/005 |
| 2017/0148371 A1* | 5/2017 | Qian | H04N 1/405 |
| 2017/0178386 A1* | 6/2017 | Redshaw | G06T 15/005 |
| 2017/0193691 A1* | 7/2017 | Langtind | G06T 15/80 |
| 2017/0251209 A1* | 8/2017 | Andersson | H04N 19/176 |
| 2017/0263039 A1* | 9/2017 | Goel | G06T 15/005 |
| 2017/0285955 A1* | 10/2017 | Carter | G09G 5/393 |
| 2017/0287100 A1* | 10/2017 | Liktor | G06T 1/20 |
| 2017/0289556 A1* | 10/2017 | Hendry | H04N 19/119 |
| 2017/0346873 A1* | 11/2017 | Denoual | H04L 65/607 |
| 2017/0352182 A1* | 12/2017 | Wang | G06T 15/005 |
| 2018/0025463 A1* | 1/2018 | Kazakov | G06T 1/20 |
| | | | 345/522 |
| 2018/0068640 A1* | 3/2018 | Martin | G06F 3/013 |
| 2018/0077411 A1* | 3/2018 | Gisquet | H04N 19/197 |
| 2018/0108331 A1* | 4/2018 | Chao | H04N 19/39 |
| 2018/0144538 A1* | 5/2018 | Jeong | G06T 11/001 |
| 2018/0165787 A1* | 6/2018 | Bolz | G06T 15/005 |
| 2018/0176551 A1* | 6/2018 | Viswanathan | H04N 9/3161 |
| 2018/0176589 A1* | 6/2018 | Deng | H04N 1/646 |
| 2018/0182066 A1* | 6/2018 | Saleh | G06T 3/40 |
| 2018/0189923 A1* | 7/2018 | Zhong | G06T 1/20 |
| 2018/0253890 A1* | 9/2018 | Cook | G06T 15/005 |
| 2018/0350036 A1* | 12/2018 | VanReenen | G06T 15/04 |
| 2019/0005703 A1* | 1/2019 | Golas | G06T 15/005 |
| 2019/0042177 A1* | 2/2019 | Tanner | G06F 3/1454 |
| 2019/0042241 A1* | 2/2019 | Akin | G06F 9/30134 |
| 2019/0114736 A1* | 4/2019 | Kokkala | G06T 15/10 |
| 2019/0139269 A1* | 5/2019 | Uralsky | G06T 11/40 |
| 2019/0196926 A1* | 6/2019 | Jong | G06F 11/277 |
| 2019/0243652 A9* | 8/2019 | Hakura | G06F 9/38 |

* cited by examiner

CONTROLLING MULTI-PASS RENDERING SEQUENCES IN A CACHE TILING ARCHITECTURE

BACKGROUND OF THE INVENTION

Field of the Invention

Embodiments of the present invention relate generally computer processing and, more specifically, to controlling multi-pass rendering sequences in a cache tiling architecture.

Description of the Related Art

Some parallel processing systems implement a tiling architecture in which a render target is divided into cache tiles. Work received by such a parallel processing subsystem is rearranged such that the work is processed in cache tile order, as opposed to primitive order. More specifically, work associated with a first cache tile is processed first, then work associated with a second cache tile is processed, then work associated with a third cache tile, and so forth. In some implementations, data associated with cache tiles is maintained in an on-chip cache memory while the cache tiles are being processed, which reduces the amount of traffic between the on-chip cache memory and off-chip frame buffer. Such an approach reduces memory bandwidth utilization and associated power consumption.

Such parallel processing systems typically execute work one "pass" at a time, where a pass includes the work involved in rendering to one render target, and a change in the render target designates a boundary between passes. For example, in a first pass, the parallel processing subsystem would render to a first render target—in cache tile order—using the cache memory and then write the final contents of the first render target to the frame buffer. Subsequently, in a second pass, the parallel processing subsystem would render to a second render target, again, in cache tile order and using the cache memory, and then write the final contents of the second render target to the frame buffer.

While parallel processing systems that implement such a "single-pass" tiling technique may optimally execute single-pass rendering tasks, such parallel processing systems do not effectively execute "multi-pass" rendering sequences across multiple render targets. More specifically, when performing a multi-pass rendering sequence, intermediate data can be generated during one execution pass that is necessary for at least one subsequent execution pass in the multi-pass rendering sequence. Such intermediate data is typically written to an intermediate render target. Consequently, in parallel processing systems that implement single-pass tiling, the intermediate data is written to the frame buffer before the next pass in the multi-pass rendering sequence executes. However, because this data is needed for at least one subsequent execution passes in the multi-pass rendering sequence, to increase performance and reduce power consumption, the data should be maintained in the cache memory and not written to the frame buffer.

For these reasons, some parallel processing systems optimize the timing involved with storing data in local cache memory and storing data in the frame buffer for limited types of multi-pass rendering sequences based on a pre-defined set of render target operations. In particular, because the data dependencies between passes in certain multi-pass rendering sequences can be pre-determined, the parallel processing system can implement specific techniques to ensure that the data required to perform the rendering operations for any given rendering pass in the multi-pass sequence is available in the cache memory instead of the frame buffer.

For example, to implement a multi-sample resolve operation, the parallel processing system could render to a multi-sample surface in the cache memory and to a single-sample surface in the frame buffer. For a given tile, the parallel processing system could render to the multi-sample surface in a region associated with the given tile. The parallel processing system would then copy rendered data from the cache memory to the frame buffer to resolve to the single-sample surface in the region. Finally, the parallel processing system could invalidate the multi-sample surface data in the region, thereby ensuring that the invalidated data is not written to the frame buffer between passes.

One drawback to implementing such pre-defined sets of render target operations is that software applications often create multi-pass rendering sequences during execution to implement a variety of rendering tasks, such as texture mapping tasks. Because such multi-pass sequences are unknown prior to execution, properly capturing such a sequence with a pre-defined set of render target operations is quite difficult, and attempts to do so usually results in errors. Notably, if the pre-defined set of render target operations does not properly reflect the data dependencies, then the parallel processing system typically resorts to writing intermediate data out to the frame buffer after the first pass, unnecessarily consuming memory bandwidth and power.

As the foregoing illustrates, what is needed in the art is a more effective approach to performing multi-pass rendering sequences in a cache tiling architecture.

SUMMARY OF THE INVENTION

One embodiment of the present invention sets forth a computer-implemented method for performing a multi-pass rendering sequence in a tile-based architecture. The method includes calculating a tile size based on algorithmic dependencies among a plurality of passes included in the multi-pass rendering sequence; calculating a set of first generation offsets based on the algorithmic dependencies; determining a first generation region based on the tile size and the set of first generation offsets; configuring a graphics processing pipeline to generate first graphics data for a first set of pixels included the first generation region; and configuring the graphics processing pipeline to store the first graphics data in a first set of cache lines included in a cache memory.

Further embodiments provide, among other things, a non-transitory computer-readable medium and a system configured to implement the method set forth above.

One advantage of the disclosed techniques is that applications can exploit cache tiling architectures to optimize arbitrarily complex multi-pass rendering sequences. In particular, because the device driver dynamically processes the dependencies between passes included in the multi-pass sequence, the device driver can optimize the data flow between a cache memory and a frame buffer. By optimizing the data flow, the device driver reduces memory bandwidth consumption and improves cache memory utilization for many multi-pass rendering scenarios compared to conventional approaches to multi-pass rendering that operate with incomplete information regarding the data dependencies between passes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
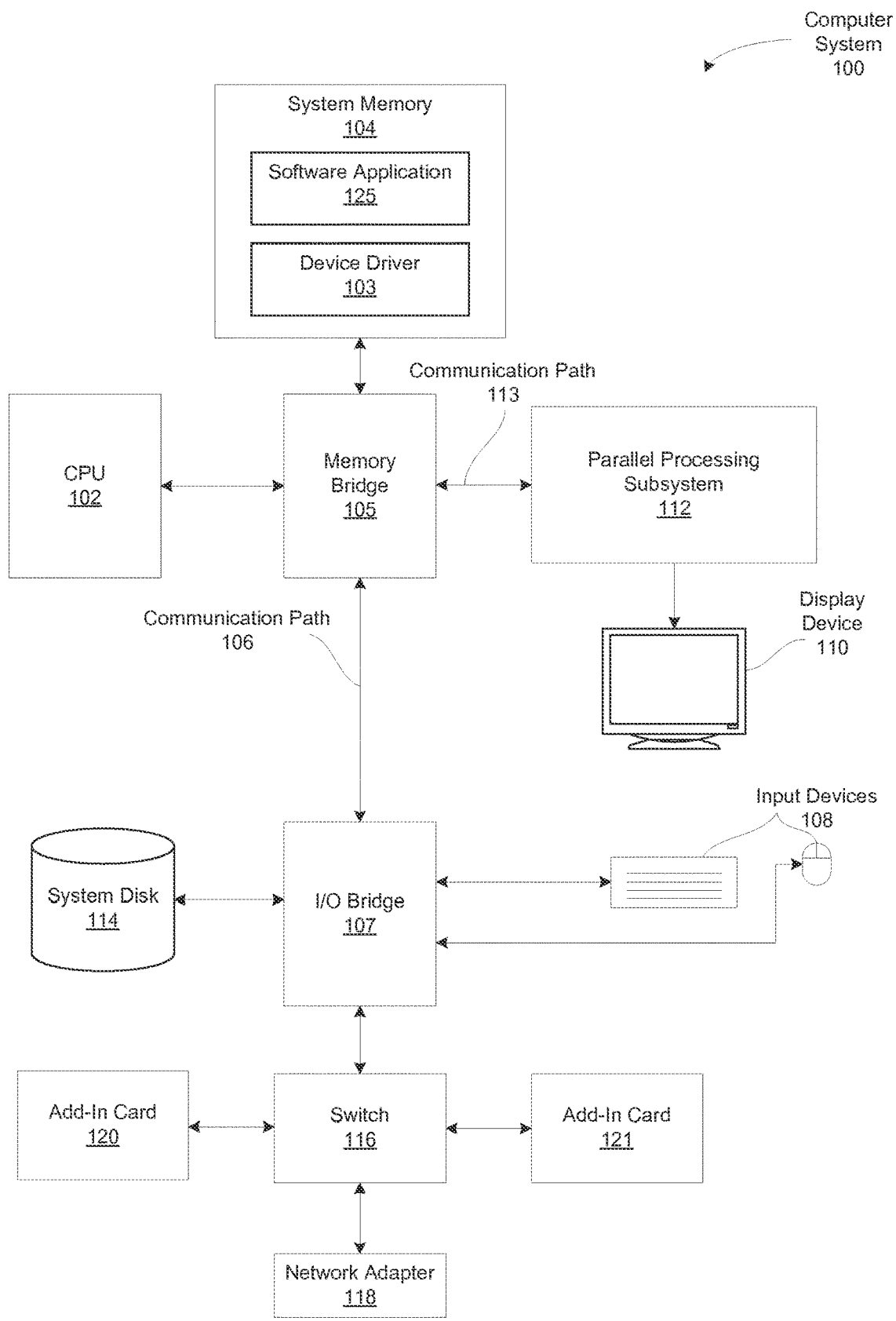
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes any number of software applications 125 that execute on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
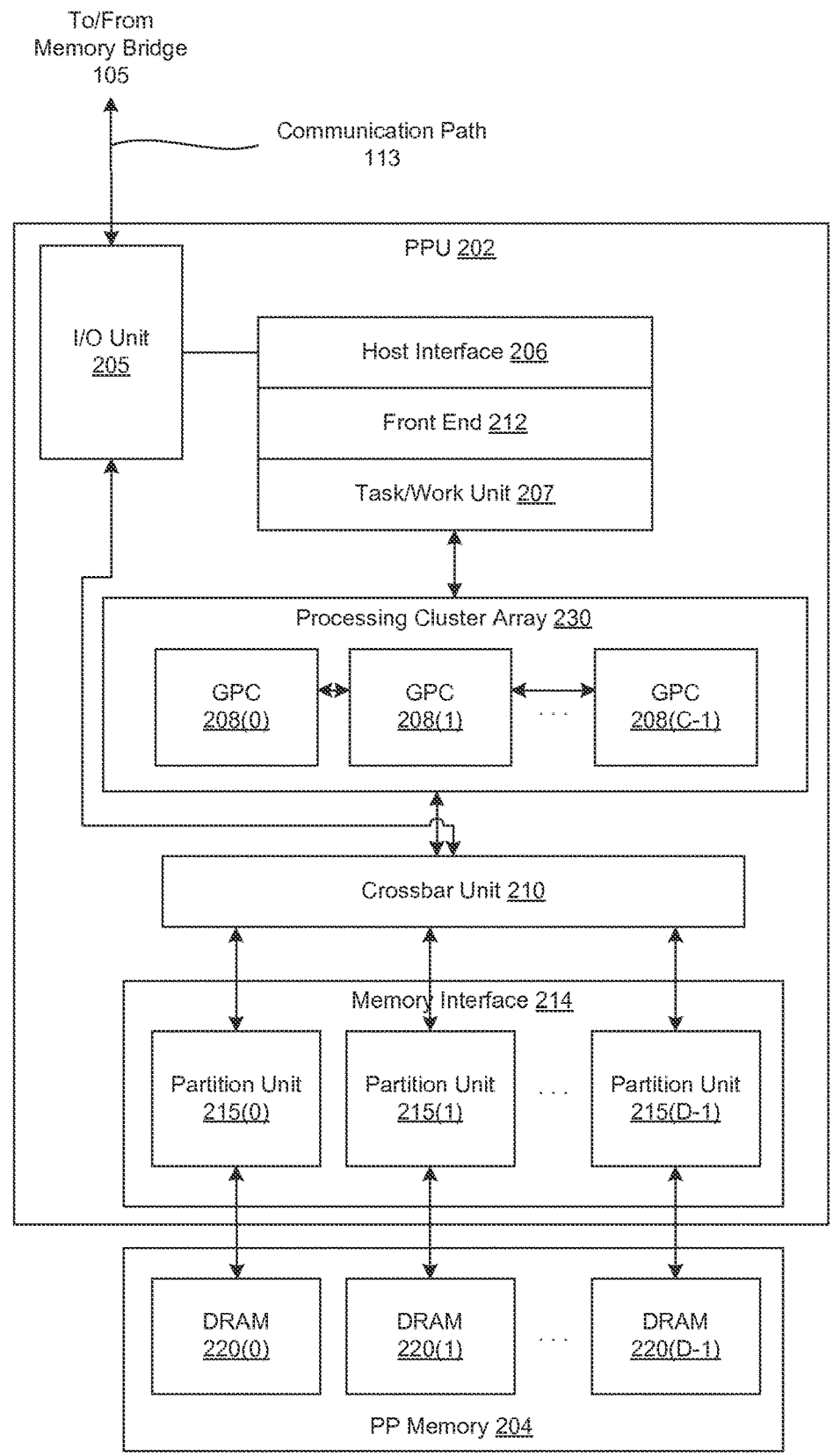
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
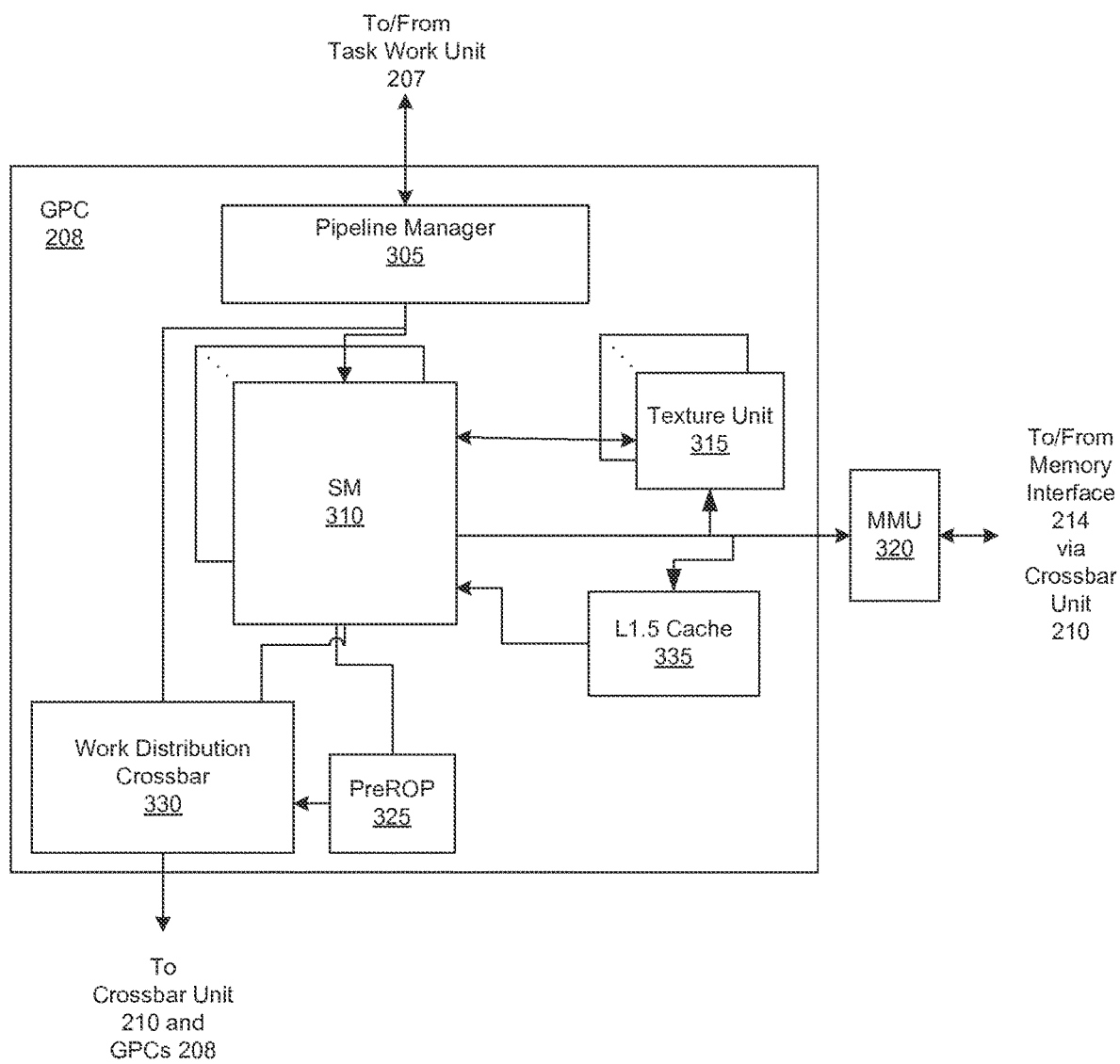
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
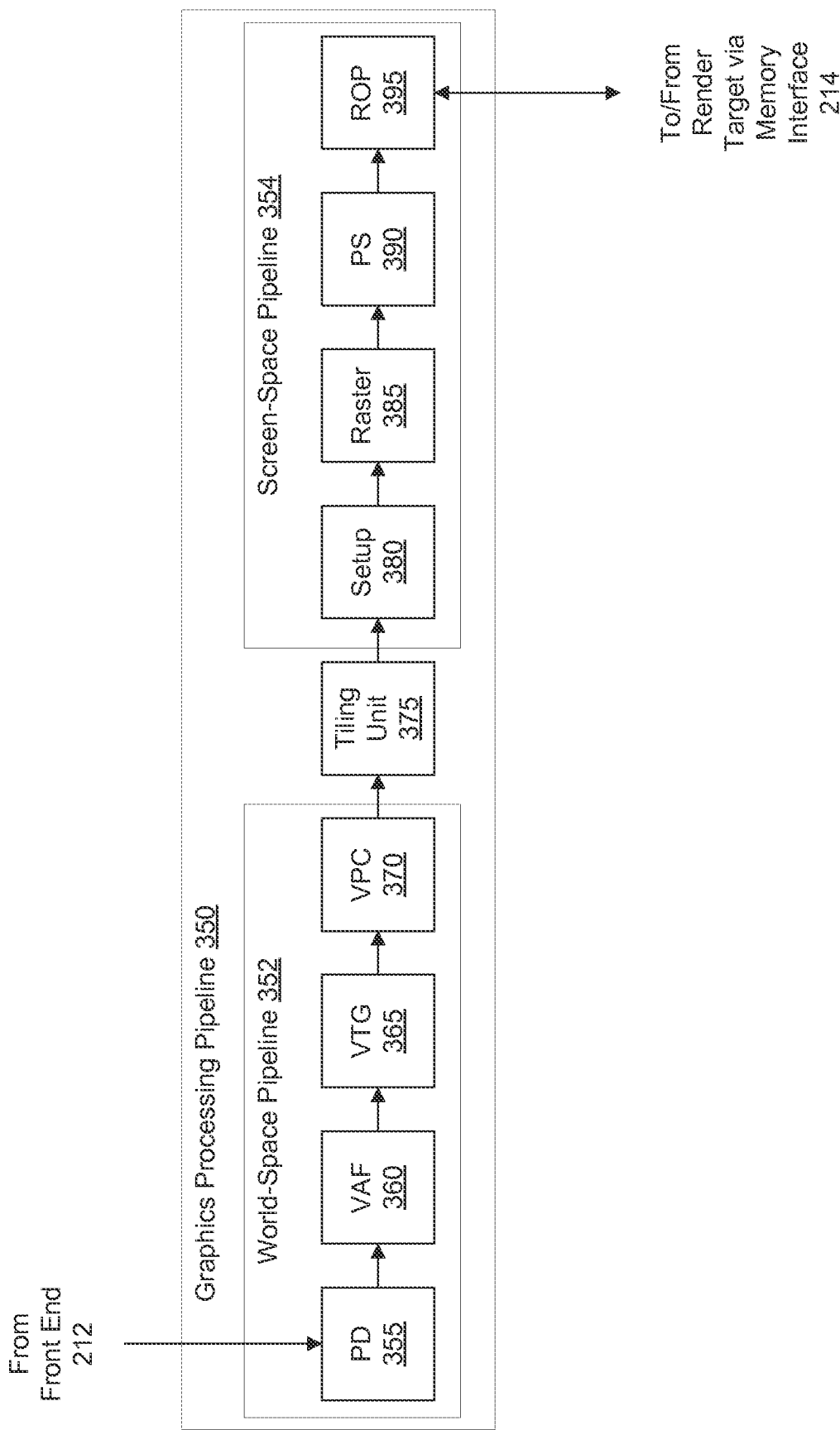
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
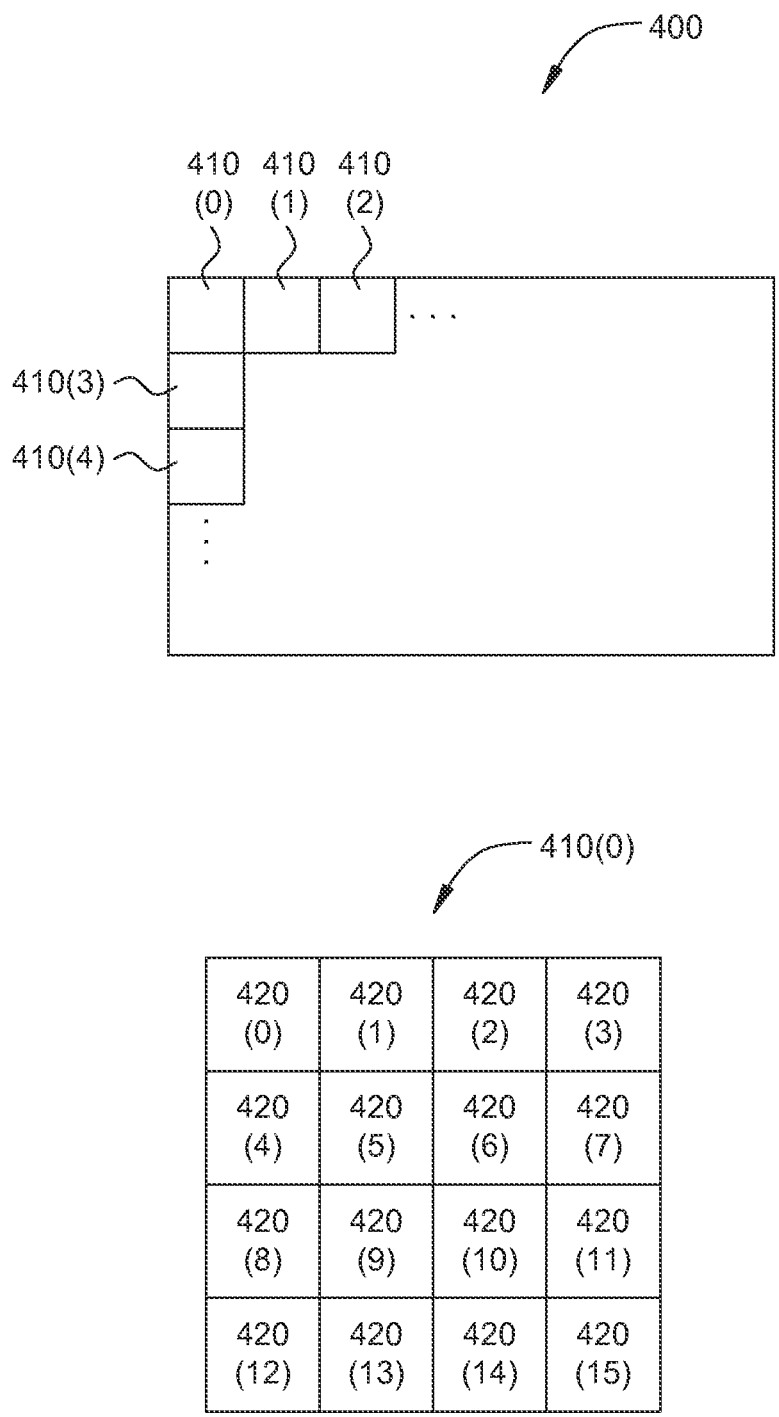
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Figure 5A:
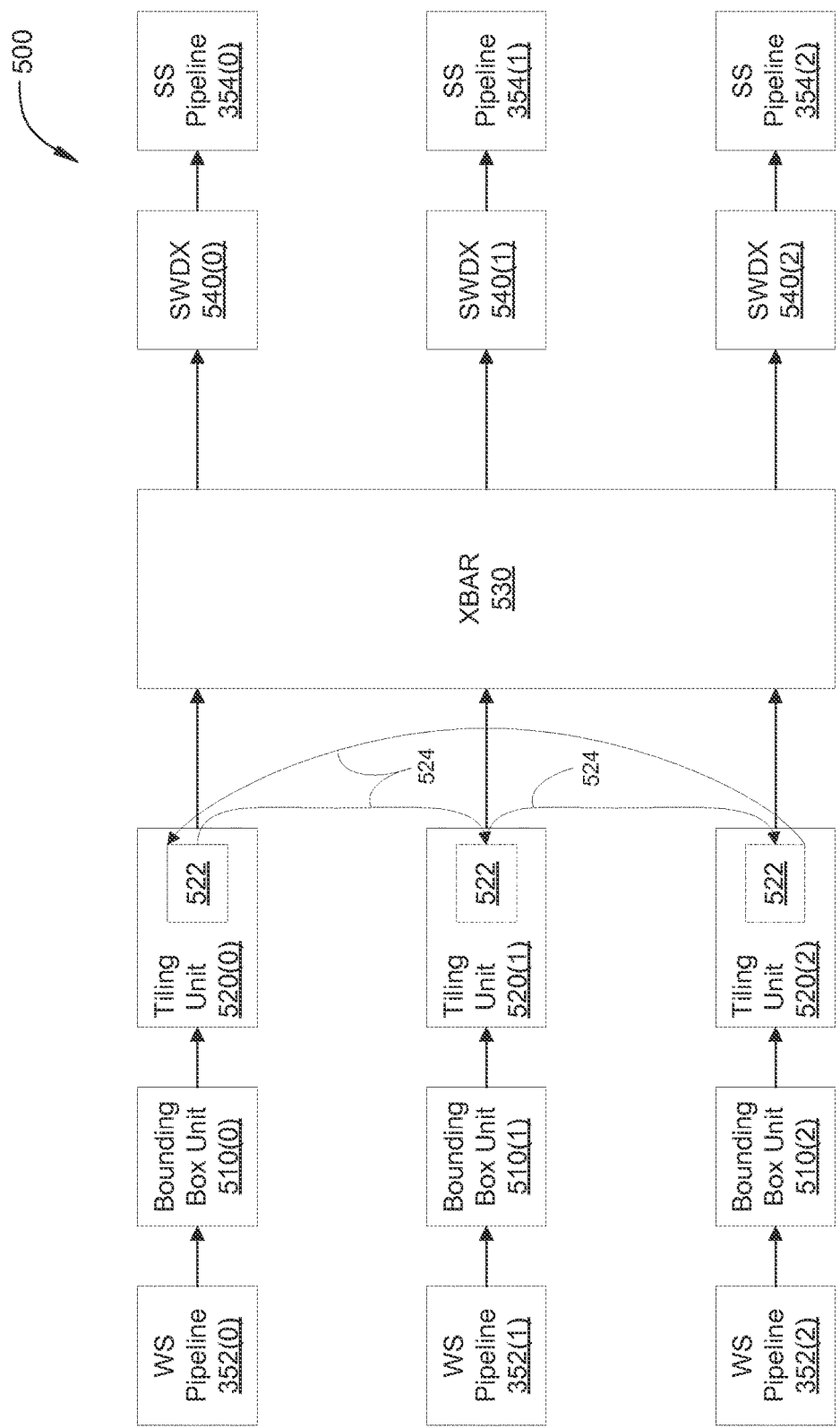
FIG. 5A illustrates a graphics subsystem configured to implement distributed tiled caching, according to one embodiment of the present invention.
Figure 5B:
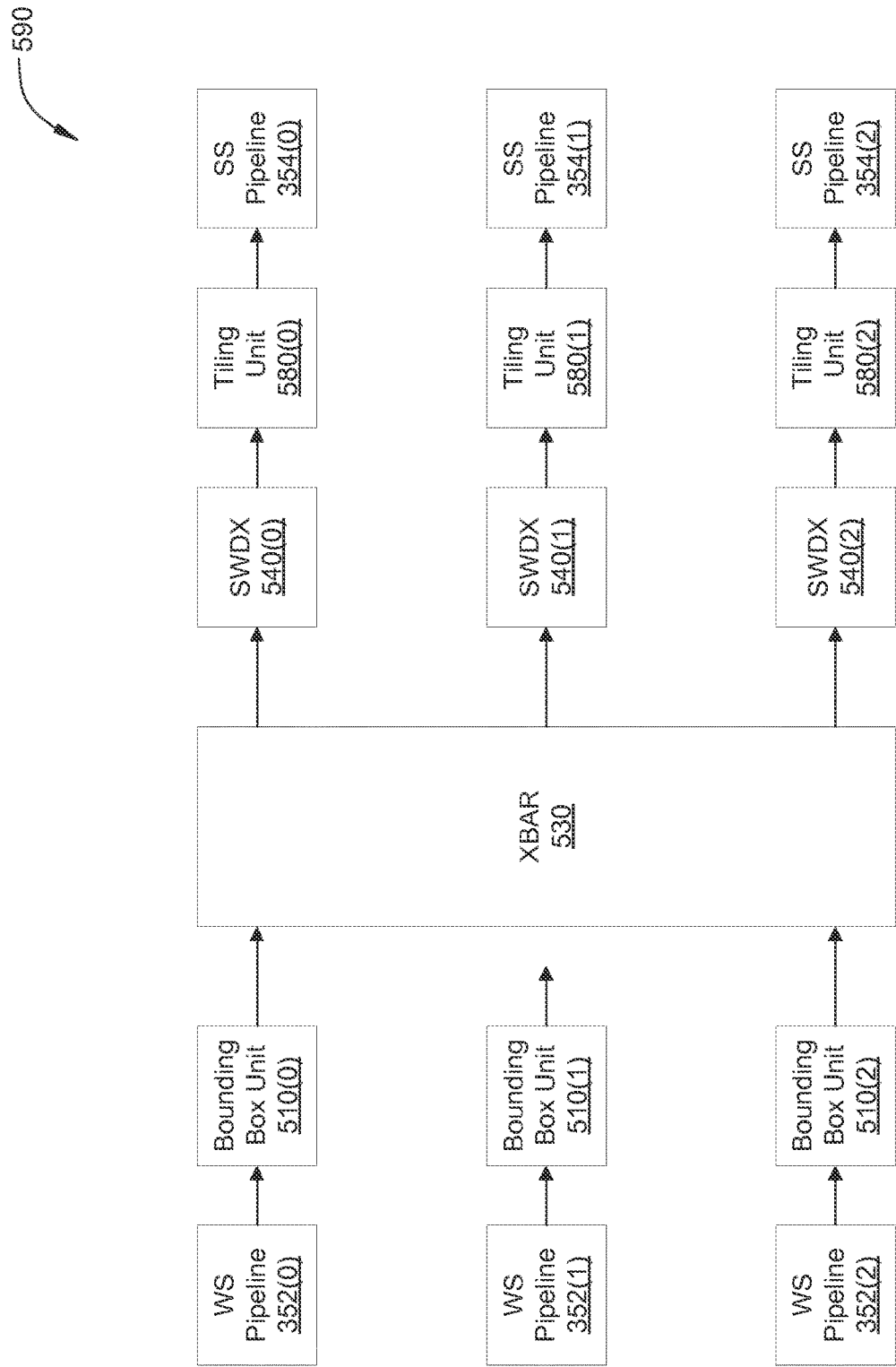
FIG. 5B illustrates a graphics subsystem configured to implement distributed tiled caching, according to another embodiment of the present invention.

FIGS. 5A-5B depict two embodiments of graphics subsystem architectures that implement distributed tiled caching. Distributed tiled caching is a technique in which multiple GPCs 208 are provided for increased processing performance. The multiple GPCs 208 implement multiple world-space pipelines 352 and multiple screen-space pipelines 354 for highly parallel graphics processing. FIG. 5A describes an approach to distributed tiled caching in which tiling units 520 are located on a world-space side of a crossbar unit 530. FIG. 5B describes an approach to distributed tiled caching in which tiling units 580 are located on a screen-space side of a crossbar unit 530.

The additional complexity that results from the presence of multiple GPCs 208 means that certain aspects of various units in the graphics subsystems described in conjunction with FIGS. 5A-5B are modified with respect to corresponding units described with respect to FIG. 3B. These modifications allow the graphics subsystem to process primitives in API order, to account for certain data dependencies, and to account for other complexities related to the introduction of multiple GPCs 208.

Distributed Tiled Caching

FIG. 5A illustrates a graphics subsystem 500 configured to implement distributed tiled caching, according to one embodiment of the present invention. As shown, the graphics subsystem 500 includes a first world-space pipeline 352(0), a second world-space pipeline 352(1), a third world-space pipeline 352(2), a first bounding box unit 510(0), a second bounding box unit 510(1), a third bounding box unit 510(2), a first tiling unit 520(0), a second tiling unit 520(1), a third tiling unit 520(2), a crossbar unit 530 ("XBAR"), a first screen-space work distribution crossbar 540(0), a second screen-space work distribution crossbar 540(1), a third screen-space work distribution crossbar 540(2), a first screen-space pipeline 354(0), a second screen-space pipeline 354(1), and third screen-space pipeline 354(2). Although the graphics subsystem 500 is shown as including three instances of the screen-space pipeline 354 and the world-space pipeline 352, the teachings provided herein apply to graphics pipelines having any number of world-space pipelines 352 and screen-space pipelines 354.

A front end unit (not shown) receives commands from the device driver 103 (not shown in FIG. 5) and schedules tasks for processing by each world-space pipeline 352. In one embodiment, the front end unit distributes tasks to the first world-space pipeline 352(0), the second world-space pipeline 352(1), and the third world-space pipeline 352(2) in round-robin order.

The first world-space pipeline 352(0), the second world-space pipeline 352(1), and the third world-space pipeline 352(2) function in a similar manner as described above with respect to FIGS. 1-4. In other words, the first world-space pipeline 352(0), the second world-space pipeline 352(1), and the third world-space pipeline 352(2) generate primitives in response to the work received from the front end unit. The world-space pipelines 352 transmit primitives to associated bounding box units 510.

A bounding box unit 510 is associated with each world-space pipeline 352. For each primitive transmitted to a bounding box unit 510, the bounding box unit 510 calculates a bounding box that determines which raster tiles 420 the primitives overlap, and therefore, to which screen space pipeline 354 the primitive should be transmitted. The bounding box units 510 also transmit bounding boxes to the tiling units 520. Each of the first world-space pipeline 352(0), the second world-space pipeline 352(1), and the third world-space pipeline 352(2) may transmit primitives to any or all of the first screen-space pipeline 354(0), the second screen-space pipeline 354(1), or the third screen-space pipeline 354(2).

Each tiling unit 520 is associated with and receives primitives from a corresponding world-space pipeline 352. Each tiling unit 520 receives primitives until the tiling unit decides to perform a flush operation. Each tiling unit 520 decides to perform a flush operation when a trigger condition occurs. One such trigger condition is that a resource counter maintained by the tiling unit 520 indicates that a particular resource exceeds a pre-set threshold. When any tiling unit 520 decides to perform a flush operation, that tiling unit 520 transmits a flush signal to all other tiling units 520, which causes those other tiling units 520 to also perform a flush operation. When a tiling unit 520 decides to perform a flush operation, the tiling unit 520 generates cache tile batches based on the primitives the tiling unit 520 has received and transmits the cache tile batches to the crossbar unit 530. Further, when a tiling unit 520 decides to perform a flush operation, the tiling unit 520 resets all resource counters associated with the tiling unit 520.

The crossbar unit 530 receives the primitives and transmits each primitive to one or more screen-space work distribution crossbar units 540 (SWDX). When a screen-space work distribution crossbar unit 540 receives primitives, the screen-space work distribution crossbar unit 540 reorders the primitives into application-programming-interface order (API order) for processing by the corresponding screen-space pipeline 354.

The screen-space pipelines 354 receive primitives and process the primitives as described above with respect to FIGS. 1-4. Each screen-space pipeline 354 is associated with a different, mutually exclusive, set of raster tiles 420. Thus, each screen-space pipeline 354 processes primitives that overlap a set of raster tiles associated with that screen-space pipeline 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0), the second world-space pipeline 352(1) may be implemented in a second GPC 208(1), and the third world-space pipeline 352(2) may be implemented in a third GPC 208(2). A GPC 208 that implements a world space pipeline 352 may also implement a screen-space pipeline 354. For example, the first GPC 208(0) may implement both the first world-space pipeline 352(0) and the first screen-space pipeline 354(0). However, each screen-space pipeline 354 is implemented by a different GPC 208 and each world-space pipeline 352 is implemented by a different GPC 208.

A detailed discussion of the operation of the tiling units 520 and the screen-space work distribution crossbar units 540 is now provided. The tiling unit 520 receives primitives from a corresponding world-space pipeline 352. The primitives are received in batches. Batches are transmitted to each world-space pipeline 352 in application-programming-interface (API) order, and in round robin fashion. For example, a first batch of primitives is transmitted to a first world-space pipeline 352(0), then a second batch of primitives is transmitted to a second world-space pipeline 352(1), then a third batch of primitives is transmitted to a third world-space pipeline 352(2), and so on. Thus, API order of batches of primitives is maintained by cycling through the world-space pipelines 352 in API order.

Additionally, the tiling units 520 receive the batches in API order by implementing a token mechanism. At any point in time during operation, one of the tiling units 520 possesses a token 522. The tiling unit 520 that possesses the token 522 is able to receive primitives from the corresponding world-space pipeline 352, while tiling units 520 that do not possess the token 522 are not able to receive primitives. The tiling unit 520 that possesses the token 522 is also able to perform a flush operation, if the tiling unit 520 determines that the tiling unit 520 is unable to accept the batch of primitives, due to the batch of primitives causing the tiling unit 520 to exceed certain local or global resources as described below. When a tiling unit 520 receives a batch of primitives, that tiling unit 520 is considered to have the most current batch of primitives, in API order. After receiving the batch of primitives, that tiling unit 520 then passes the token 522 to the next tiling unit 520, causing that next tiling unit 520 to be able to receive primitives. When the next tiling unit 520 receives the next batch of primitives in API order, that tiling unit 520 passes the token 522 to the next tiling unit, and so on. The token 522 is passed in a cyclical order, as indicated by token passing arrows 524, which allows each tiling unit 520 to have a turn accepting primitives.

In addition to being able to accept primitives, the token 522 also allows the tiling unit 520 to perform a flush operation. When a tiling unit 520 decides to perform a flush operation, the tiling unit 520 has one or more batches of primitives. Because the batches of primitives are passed to the tiling units 520 in rotating API order, the batches of primitives that each tiling unit 520 includes may have "gaps." For example, the first tiling unit 520(0) may receive a first batch of primitives and a fourth batch of primitives, but not second or third batches of primitives in API order, which are transmitted to the second tiling unit 520(1) and the third tiling unit 520(2), respectively.

Because the primitives transmitted from each tiling unit 520 may include gaps in API order, when one tiling unit 520 performs a flush operation, all other tiling units 520 also perform a flush operation. Causing all tiling units 520 to perform a flush operation at the same time allows the screen-space work distribution crossbars 540 to receive primitives from all batches in API order, without gaps, because each tiling unit 520 "covers" the gaps of the other tiling units. In other words, even though individual tiling units 520 may have gaps in API order, when the tiling units 520 perform a flush operation together, the primitives that are transmitted by the tiling units 520 include all primitives, without gaps.

When a tiling unit 520 decides to perform a flush operation, the tiling unit 520 generates cache tile batches, and transmits the cache tile batches downstream to the crossbar 530, for distribution to the screen-space pipelines 354. For each screen-space pipeline 354, a screen-space work distribution crossbar 540 receives the cache tile batches including primitives and reorganizes the primitives into API order for each cache tile.

To generate the cache tile batches, each tiling unit 520 accepts and stores primitives until the tiling unit 520 decides to perform a flush operation. Each cache tile batch is associated with a different cache tile and includes primitives that overlap that cache tile. In one embodiment, the tiling unit 520 determines which cache tile the primitives overlap by comparing a border of the cache tile with bounding boxes received from a bounding box unit 510. Upon receiving a batch of primitives, a tiling unit 520 updates several resource counters associated with the batch of primitives. If any of the resource counters indicates that a resource has exceeded a threshold, then the tiling unit 520 performs a flush operation.

The resource counters are configured to track the degree of utilization of various resources associated with the primitives received by the tiling units 520. Resources are either global resources or local resources. Global resources are pools of resources that are shared by all tiling units 520. Local resources are independently maintained by each tiling unit 520 and are not shared. Several examples of such resources are now provided.

One type of local resource is a primitive storage space for storing primitives. Each tiling unit 520 includes a primitive storage space that is maintained independently of primitive storage space for other tiling units 520. When a tiling unit 520 receives a primitive, some of the primitive storage space is occupied by the primitive.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 520 maintains a count of the amount of space occupied by circular buffer entries associated with primitives in the tiling unit 520.

In one embodiment, the vertex attribute circular buffer may be structured as a collection of smaller per-world-space-pipeline circular buffers. Each per-world-space pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When the tiling units 520 perform a flush operation, the cache tile batches that include primitives arrive at the crossbar unit 530, which transmits the primitives in the cache tile batches to the screen-space work distribution crossbar units 540. The screen-space work distribution crossbars 540 reorganize primitives within each cache tile into API order. The screen-space work distribution crossbars 540 output cache tile batches that include primitives arranged in API order to the screen-space pipelines 354 for processing by the screen-space pipelines 354.

FIG. 5B illustrates a configuration of a graphics subsystem 800 in which tiling units 820 are located on the screen-space side of a crossbar unit 530. The architecture and operation of graphics subsystem 590 is now described in detail.

FIG. 5B illustrates the graphics subsystem 590 configured to implement distributed tiled caching, according to another embodiment of the present invention. As shown, the graphics subsystem 590 includes a first world-space pipeline 352(0), a second world-space pipeline 352(1), a third world-space pipeline 352(2), a first bounding box unit 510(0), a second bounding box unit 510(1), a third bounding box unit 510(2), a crossbar unit 530 ("XBAR"), a first screen-space work distribution crossbar 540(0), a second screen-space work distribution crossbar 540(1), a third screen-space work distribution crossbar 540(2), a first tiling unit 580(0), a second tiling unit 580(1), a third tiling unit 580(2), a first screen-space pipeline 354(0), a second screen-space pipeline 354(1), and third screen-space pipeline 354(2).

In a similar manner as with the graphics subsystem 500 depicted in FIG. 5A, the graphics subsystem 590 includes at least three instances of the screen-space pipeline 354 and the world-space pipeline 352, for increased performance. The functionality of the world-space pipelines 352 and the screen-space pipelines 354 is similar to the functionality of the corresponding units disclosed in FIGS. 1-5. However, the tiling units 580 are located on the screen-space side of the crossbar unit 530, instead of being located on the world-space section of the crossbar unit 530. Thus, tiling operations (i.e., associating primitives with cache tiles and generating cache tile batches) do not occur until after primitives have been transmitted to the screen-space side of the cross-bar unit 530 and after the primitives from the world-space pipelines 352 have been arranged into API order by the screen-space work distribution crossbars 540.

The first world-space pipeline 352(0), the second world-space pipeline 352(1), and the third world-space pipeline 352(2) function in a similar manner as described above with respect to FIGS. 1-4. In other words, the first world-space pipeline 352(0), the second world-space pipeline 352(1), and the third world-space pipeline 352(2) generate primitives in response to the work received from the front end unit.

The world-space pipelines 352 transmit these primitives through the crossbar unit 530 to one or more screen-space pipelines 354 associated with raster tiles that the primitives overlap. Screen-space work-distribution crossbars 540 associated with the screen-space pipelines 354 receive the primitives, reorder the primitives into API order, and provide the primitives to the tiling units 580.

Each tiling unit 580 receives primitives from the screen-space work distribution crossbar 540 and generates cache tile batches based on the primitives. The tiling units 580 generate a cache tile batch by aggregating primitives that overlap the cache tile associated with the cache tile batch. The tiling units 580 may determine which primitives overlap a particular cache tile by comparing bounding boxes received from bounding box units 510 with a border of the cache tile. Just as with the tiling units 520 depicted in FIG. 5, the tiling units 580 depicted in FIG. 8 maintain resource counts for both local and global resource types. Each tiling unit 580 maintains resource counts for local resources independently of each other tiling units 580. When one tiling unit 580 determines that a resource count is exceeded, the tiling unit 580 performs a flush operation. Unlike with the tiling units 520 depicted in FIG. 5, the tiling units 580 depicted in FIG. 8 do not transmit a signal to other tiling units 580 that causes those tiling units to perform a flush operation when the original tiling unit 580 performs a flush operation. Each tiling unit 580 is able to perform a flush operation independently because unlike with the tiling units 520 depicted in FIG. 5, there is no possibility for gaps to form. In other words, the world-space pipelines 352 simply transmit the primitives to the screen-space pipelines 354 to which the primitives are destined. Only primitives that are associated with a particular screen-space pipeline 354 are transmitted to any particular tiling unit 580, so that tiling unit 580 has all of the primitives that are needed in any particular sequence of primitives.

Because the tiling unit 580 is across the crossbar unit 530 from the world-space pipeline 352 and the bounding box unit 510, the crossbar unit 530 transmits bounding boxes to the tiling unit 580 in order to permit the tiling unit 580 to determine which cache tiles primitives are associated with. The crossbar unit 530 also transmits other information that is useful to the tiling unit 580. For example, the crossbar unit 530 transmits an amount of space occupied by circular buffer entries associated with primitives to the tiling unit 580 to permit the tiling unit 580 to update resource counters associated with the circular buffers. The crossbar unit 530 or another unit may also transmit additional information related to the local and global resources discussed above with respect to FIG. 5 to the tiling units 580, to permit the tiling units 580 to update associated resource counters. The tiling units 580 organize the primitives that the tiling units 580 receive into cache tile batches that each include primitives in API order.

Multi-Pass Tiled Rendering

One challenging aspect of the architecture described above in FIGS. 1-5 is that pipelining introduces data dependencies associated with multi-pass rendering sequences. As previously outlined, a pass includes the work involved in rendering to one render target and a change in the render target designates a boundary between passes. In multi-pass rendering sequences the parallel processing subsystem 112 renders to one or more intermediate render targets in addition to a final render target.

Notably, for each pass, the operations that generate graphics data may be dependent on the results of operations performed during any number of previous passes included in the multi-pass sequence. These data dependencies are complicated by the inclusion of multiple processing entities. An additional challenging aspect of executing multi-pass rendering sequences in a parallel processing subsystem that implements a cache tiling architecture is managing data flow between the cache memory that stores the cache tiles, also referred to herein as "tiles," and an external memory, such as the frame buffer. As described above, intermediate data, such as texel data, is needed only during a subset of the passes included in a multi-pass sequence, and is not the final output for the task. Such intermediate data need not be written out from the cache memory to the frame buffer, and writing such intermediate data out to the frame buffer would unnecessarily consume memory bandwidth and power.

The techniques described below include mechanisms for managing data dependencies associated with multi-pass rendering sequences and for managing data flow to and from a cache memory in a parallel processing subsystem that implements a cache tiling architecture. More specifically, the device driver 103 configures elements included in the parallel processing subsystem 112, such as the screen-space work distribution crossbars 540, to exploit the effectiveness of the cache tiling architecture while honoring the data dependencies between passes in multi-pass rendering sequences.

In alternate embodiments, the parallel processing subsystem 112 may support any type of parallel processing operations and the multi-pass rendering sequences may be replaced with any type of multi-pass sequences of operations. Further, the graphics processing pipeline 350 may be replaced with any type of parallel processing pipeline, and any number of units that implement the parallel processing pipeline may be altered in any technically feasible fashion to support the multi-pass control techniques outlined herein.

Figure 6:
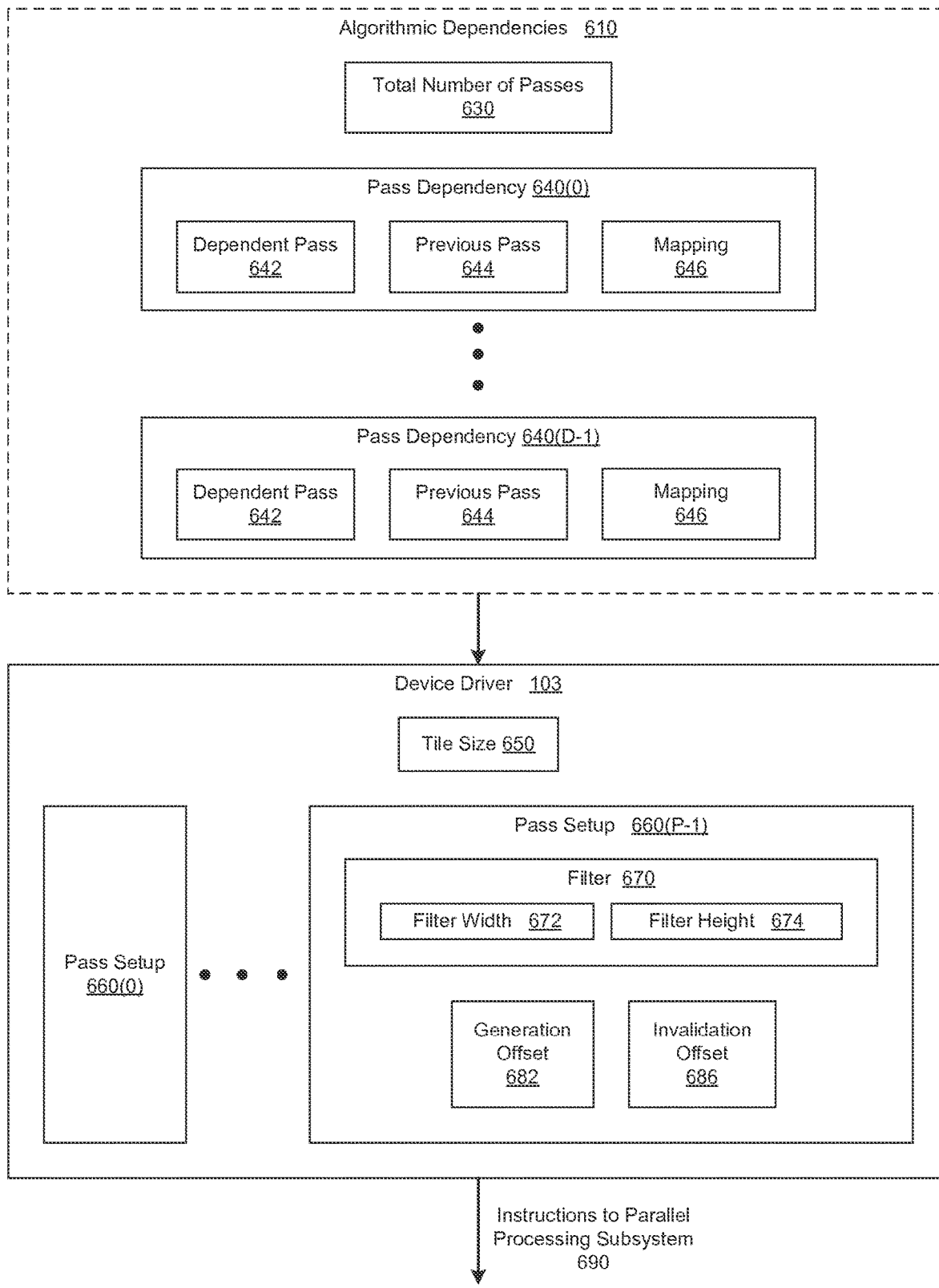
FIG. 6 illustrates how the device driver of FIG. 1 configures a parallel processing subsystem to perform a multi-pass rendering sequence involving a plurality of cache tiles, according to one embodiment of the present invention.

FIG. 6 illustrates how the device driver 103 of FIG. 1 configures the parallel processing subsystem 112 to perform a multi-pass rendering sequence involving a plurality of cache tiles, according to one embodiment of the present invention. As shown, the device driver 103 receives algorithmic dependencies 610 and generates instructions to parallel processing subsystem 690.

As described above, each tile is associated with a portion, referred to herein as a region, of a render target that includes a set of pixels. Processing for any particular tile occurs for the region of the render target associated with the tile. However, work associated with a tile may be configured to act on a region of a render target that is offset with respect to the region of the render target normally associated with the tile—the "default region." For example, in some embodiments a modifiable scissor rectangle specifies whether and to what extent any work being processing by the graphics processing pipeline 350 is translated.

In operation, the device driver 103 leverages the algorithmic dependencies 610 to manage data flow to and from the cache memory during the multi-pass rendering sequence via the instructions to parallel processing subsystem 690 that configure the work associated with the tiles. In particular, as part of processing each tile, the device driver 103 configures the parallel processing subsystem 112 to retain data for pixels that lie outside the default region in the cache memory as per the algorithmic dependencies 610. Further, as persons skilled in the art will recognize, complicated multi-pass rendering sequences may require data for relatively large numbers of pixels that lie outside the default region to remain resident between passes. Accordingly, as data stored in the cache memory is no longer required for future passes, the device driver 103 configures the parallel processing subsystem 112 to invalidate the cache lines that include this superfluous data.

In operation, the device driver 103 receives the algorithmic dependencies 610 prior to executing a multi-pass rendering sequence. The device driver 103 may receive the algorithmic dependencies 610 in any technically feasible fashion. For example, the device driver 103 could include an application programming interface (API) that could enable the device driver 103 to receive the algorithmic dependencies 610 from the software application 125 via one or more function calls.

The algorithmic dependencies 610 include information that enables the device driver 103 to configure the parallel processing subsystem 112 to properly and optimally execute multi-pass rendering sequences. As shown, the algorithm dependencies 610 includes, without limitation, a total number of passes 630 and any number of pass dependencies 640. The total number of passes 630 specifies the total number of passes included in a multi-pass rendering sequence, and each of the pass dependencies 640 specifies a relationship between two of the passes included in the multi-pass rendering sequence.

Each of the pass dependencies 640 includes, without limitation, a dependent pass 642, a previous pass 644, and a mapping 646. Both the dependent pass 642 and the previous pass 644 specify passes that are included in the multi-pass rendering sequence. However, the dependent pass 642 is located after the previous pass 644 in the multi-pass rendering sequence, and graphics operations that the parallel processing subsystem 112 perform as part of the dependent pass 642 use data generated by graphics operations that the parallel processing subsystem 112 perform as part of the previous pass 644.

For example, the pass dependency 640(16) could include the dependent pass 642 "$5^{th}$ pass" and the previous pass 644 "$4^{th}$ pass" to specify that graphics operations performed as part of the $5^{th}$ pass rely on data generated by graphics operations performed as part of the $4^{th}$ pass. Further, the pass dependency 640(15) could include the dependent pass 642 "$5^{th}$ pass" and the previous pass 644 "$3^{rd}$ pass" to specify that graphics operations performed as part of the $5^{th}$ pass rely on data generated by graphics operations performed as part of the $3^{rd}$ pass.

In general, any pass may depend on any number, including zero, of previous passes, and each pass may depend on a different number of previous passes. Further, as persons skilled in the art will understand, in addition to accepting input data that lies within the default region, graphics commands operating on pixels included in a tile may also rely on input data that lies outside the default region. For example, a texturing command that is generating data for a particular pixel included in a default region may use data generated during a previous pass for a neighborhood of pixels that surrounds the particular pixel, where not all of the pixels included in the neighborhood are also included in the default region.

To accommodate, among other things, dependencies between passes that are not one-to-one, the mapping 646 enables the software application 125 to specify a correlation between the data generated for each of the pixels as part of the dependent pass 642 and the data generated for any number of pixels as part of the previous pass 644. In general, such a correlation defines a rectangular region of (−minimum_x,maximum_x) by (−minimum_y,maximum_y) relative to a given pixel that is referred to herein as a "dependency neighborhood." Notably, as processing units included in the parallel processing subsystem 112 perform graphics operations during the dependent pass 642, the processing units fetch data generated from the previous pass 644 for pixels that lie within the dependency neighborhood. The mapping 646 may specify the dependency neighborhood in any technically feasible fashion.

As shown, upon receiving the algorithmic dependencies 610, the device driver 103 computes a tile size 650 and, consequently, the extent of each default region. As a general matter, the device driver 103 selects the tile size 650 of the tile such that the tile data required for each graphics operation performed during each pass in the multi-pass sequence is resident in the cache memory when the parallel processing subsystem 112 performs the graphics operation. The device driver 103 calculates the tile size 650 based on the algorithmic dependencies 610 and any additional constraints, such as number of samples per pixel, cache memory constraints, and the like.

In general, based on the algorithmic dependencies 610, the device driver 103 calculates the maximum number of bytes that the multi-pass sequence requires to be simultaneously resident in the cache memory. First, the device driver 103 determines the number of bytes per pixel that need to be resident in the on-chip memory for each render target in the multi-pass sequence. Subsequently, based on the mappings 646, the device driver 103 calculates the maximum dependency neighborhood and, consequently, the number of pixels that lie outside the boundary of each tile that are optimally resident in the cache memory. Finally, the device driver 103 identifies a maximum "pass dependency depth" as the maximum number of previous passes on which any pass included in the multi-pass sequence may depend. Based on the number of bytes per pixel per render target, the maximum dependency neighborhood and the maximum pass dependency depth, the device driver 103 calculates the maximum number of bytes that the multi-pass sequence requires to be simultaneously resident in the cache memory.

For example, each pass may only depend on the immediately preceding pass and the device driver 103 could select the tile size 650 to enable the cache memory to simultaneously store dependency neighborhood data for one pass and tile data for another pass. Alternatively, the sixth pass may depend on the five preceding passes and the device driver 103 could select the tile size 650 to enable the cache memory to simultaneously store dependency neighborhood data for five passes and tile data for the sixth pass.

Based on the maximum number of bytes per pixel, the size of the cache memory, and any additional cache memory constraints, the device driver 103 selects the tile size 650. For example, if the cache memory is also used to store other data, then the device driver 103 could select the tile size 650 such that the tiles consume only a specific portion of the cache memory. In general, as part of calculating the tile size 650, the device driver 103 may consider a number of factors, including, the quantity and configuration of the render targets associated with the screen space 400, the quantity of samples per pixel, and whether the data stored in the tile is compressed. The device driver 103 then configures the parallel processing subsystem 112 to implement the tile size 650 via one or more instructions included in the instructions to parallel processing subsystem 690.

As shown, the device driver 103 also generates the pass setups 660(0)-660(P−1), where the P is the total number of passes 630 specified in the algorithmic dependencies 610. For each pass included in the multi-pass sequence, the device driver 103 configures the parallel processing subsystem 112 based on the corresponding pass setup 660. More specifically, based on the pass setups 660, the device driver 103 includes commands in the instructions to parallel processing subsystem 690 that ensure that the data dependencies between the passes are honored without fetching data from external memory, such as the frame buffer.

In some embodiments, the device driver 103 may generate all the pass setups 660(0)-660(P−1) before transmitting the commands that configure the parallel processing subsystem 112 to perform the first pass. In other embodiments, the device driver 103 may determine the pass setup 660(0), transmit the commands that configure the parallel processing subsystem 112 to perform the first pass, determine the pass setup 660(1), transmit the commands that configure the parallel processing subsystem 112 to perform the second pass, and so forth. In some embodiments, the device driver 103 may not explicitly generate the pass setups 660, but instead leverage similar algorithms to generate commands on-the-fly that the device driver 103 includes in the instructions to parallel processing subsystem 690.

As shown, the pass setup 660 includes, without limitation, the filter 670, the generation offset 682, and the invalidation offset 686. Further, the filter 670 includes, without limitation, a filter width 672 and a filter height 674. For explanatory purposes, the filter 670 that includes a filter width 672 of filter_x and a filter height 674 of filter_y is specified herein as (filter_x,filter_y). In a similar manner, the generation offset 682 having a horizontal offset of generate_x and a vertical offset of generate_y is specified herein as (generate_x,generate_y). Further, the invalidation offset 686 having a horizontal offset of invalidate_x and a vertical offset of invalidate_y is specified herein as (invalidate_x, invalidate_y).

The device driver 103 sets the filter 670 to reflect the dependency neighborhood specified by the algorithmic dependencies 610. For example, if the dependency neighborhood extends beyond the default region by a width of two pixels and a height of one pixel, then the device driver 103 sets the filter 670 to (2, 1). In alternate embodiments, the filter 670 may specify a square region and include a single value that specifies the single dimension of the square.

The device driver 103 uses the generation offset 682 and the invalidation offset 686 as part of a "tile-lag" approach to controlling multi-pass sequence rendering. As used herein, tile-lag refers to a translation in a backward direction relative to the "traversal line" in which the parallel processing subsystem 112 processes the tiles. For each tile, the device driver 103 configures the parallel processing subsystem 112 to perform operations that generate results for a per-pass "generation" region of the render target. After the initial pass, the device driver 103 configures the generation region to lag behind the default region. Notably, the device driver 103 increases the magnitude of the lag for each dependent pass. The device driver 103 implements this tile-lag approach to ensure that the data required from previous passes to perform graphics operations on the pixels included in the generation region is available in the cache memory. In a similar fashion, after each pass the device driver 103 may configure the parallel processing subsystem 112 to invalidate cache lines that include temporary data for a per-pass "invalidation" region of one or more previous render targets. Notably, for each pass, the invalidation region lags the generation region.

In operation, after determining the filters 670, the device driver 103 sets the generation offsets 682 to define the generation regions. In particular, for each generation offset 682, the device driver 103 sets the corresponding generation region to the default region translated by the generation offset 682 in a backward direction relative to the traversal line. Notably, by setting the generation offsets 682 based on the filters 670, the device driver 103 ensures that the data required to perform graphics operations on the pixels included in the generation region is available in the cache memory as-needed.

The device driver 103 may employ any number of technically feasible algorithms to ensure that the generation offsets 682 correctly reflect the data dependencies between the passes included in the multi-pass rendering sequence. For example, if each pass in a multi-pass rendering sequence depends only on the immediately preceding pass, then the device driver 103 could set each of the generation offsets 682 to the sum of the generation offset 682 of the immediately preceding pass and the filter 670 of current pass. For example, in such a scenario, if the filter 670(1) was (1, 2) and the filter 670(2) was (2,3) then the device driver 103 could set the generation offset 682(1) to (1, 2) and the generation offset 682(2) to (3, 5).

In alternate embodiments, the device driver 103 may perform any number of operations to ensure that the generation offset 682 are consistent with a granularity that is supported by the parallel processing subsystem 112. In some such embodiments, the device driver 103 may be configured to round the generation offsets 682 up to a granularity that is supported by the parallel processing subsystem 112. Further, the device driver 102 may determine and set the granularity in any technically feasible fashion. For example, if the size of the raster tile 420 was (2,2), the filter 670(1) was (1, 2), and the filter 670(2) was (2,3), then the device driver 103 could set the generation offset 682(1) to (2, 2) and the generation offset 682(2) to (4, 6).

After determining the generation offsets 682, the device driver 103 sets the invalidation offsets 686 to define the invalidation regions. For each of the invalidation offsets 686, the device driver 103 sets the corresponding invalidation region to default region translated by the invalidation offset 686 in a backward direction relative to the traversal line. In general, the device driver 103 sets the invalidation offsets 686 based on the filters 670 in a systematic manner that ensures that the data generated during previous passes for pixels included in the invalidation region is no longer required. For example, if each pass included in a multi-pass sequence depends only on the immediately preceding pass, then the device driver 103 could set each of the invalidation offsets 686 to the sum of the generation offset 682 of the current pass and the filter 670 of the current pass.

As persons skilled in the art will recognize, the invalidation region typically lags behind the generation region by the filter 670 included in the current pass setup 660. The device driver 103 may employ any number of technically feasible algorithms to ensure that the invalidation offsets 686 correctly reflect when data stored in the cache memory becomes superfluous. In particular, such algorithms reflect the dependency depth and, consequently, one or more of the pass setups 660 may not include a corresponding invalidation offset 686. For example, if each pass is dependent upon five previous passes then the device driver 103 would not include the invalidation offset 686 in the pass setups 660 associated with the first through the fourth pass. In some embodiments, the device driver 103 may set the invalidation offset 686 to NULL to indicate that there is no superfluous data included in the cache at the end of the associated pass.

After processing the algorithmic dependencies 610, the device driver 103 generates the instructions to parallel processing subsystem 690 that configure the parallel processing subsystem 112 to perform the multi-pass rendering sequence. In general, the instructions to parallel processing subsystem 690 include, without limitation, one or more instructions that set the size of the tile to the tile size 650, and sets of per-pass instructions. Each set of per-pass instructions includes, without limitation, a command to translate the default region backwards by the generation offset 682 and commands to perform graphics operations on pixels included in this generation region. If the invalidation offset 686 is associated with the pass, then the per-pass instructions also include a command to translate the default region backwards by the invalidation offset 686, and one or more commands to invalidate the cache lines for the pixels included in this invalidation region for one or more previous passes.

In general, the instructions to parallel processing subsystem 690 may configure the parallel processing subsystem 690 in any technically feasible fashion to implement the general tile-lag process outlined above. For example, in some embodiments, to set the generation region, the device driver 103 may configure the parallel processing subsystem 112 via a modifiable scissor rectangle that specifies whether and to what extent any graphics operations being performed by the graphics processing pipeline 350 are translated. Further, the units in the parallel processing subsystem 690 may be modified in any technically feasible fashion to support and/or optimize the tile-lag process. For example, in some embodiments, the screen-space work distribution crossbar units 540 may be modified to optimally support the horizontal and vertical translation operations as programmed by the device driver 103.

Figure 7:
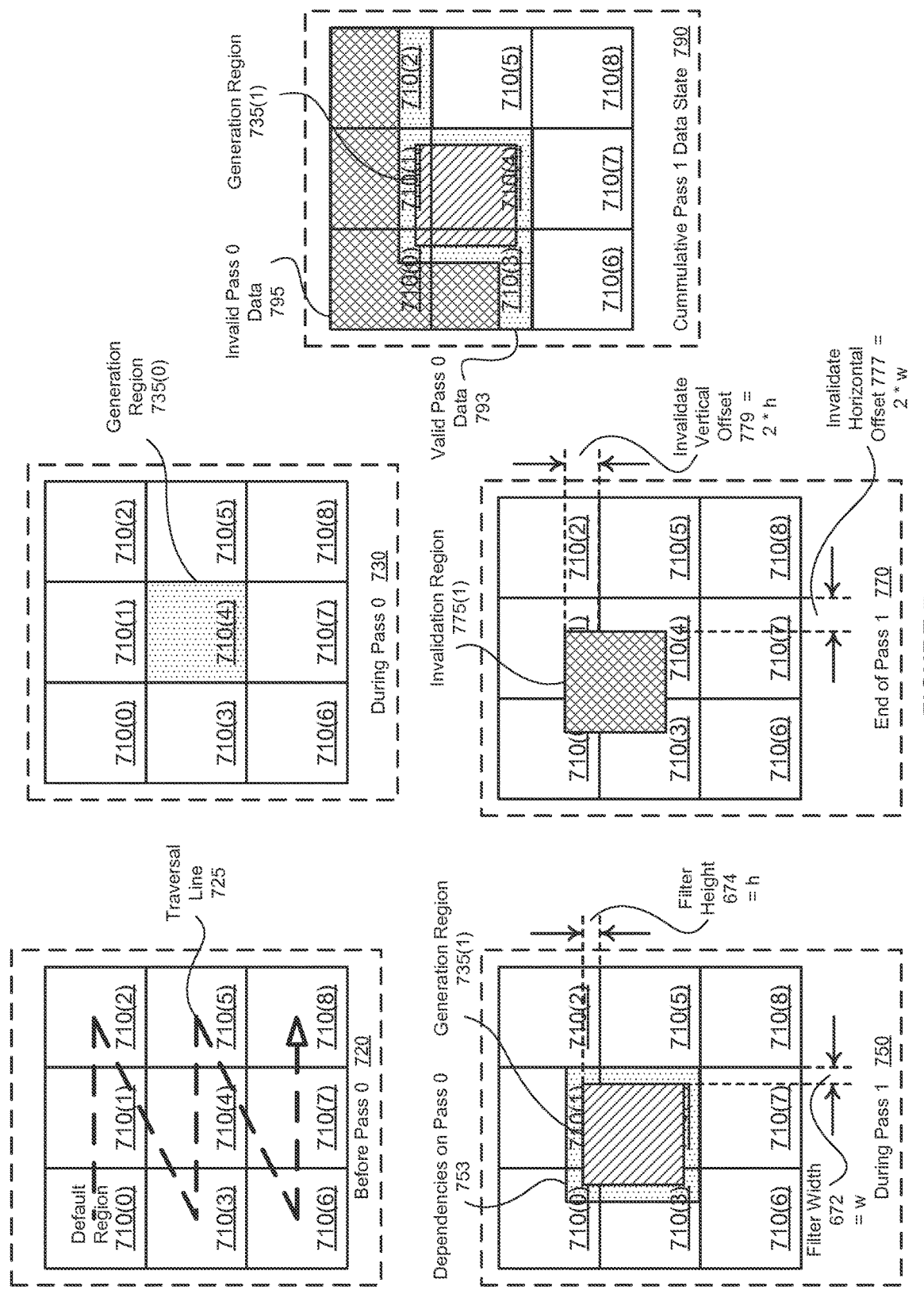
FIG. 7 illustrates the results of operations that the parallel processing subsystem performs during a multi-pass rendering sequence involving a plurality of cache tiles, according to one embodiment of the present invention.

FIG. 7 illustrates the results of operations that the parallel processing subsystem 112 performs during a rendering sequence involving a plurality of cache tiles, according to one embodiment of the present invention. For explanatory purposes, FIG. 7 illustrates the states of a three-by-three set of nine default regions 710(0)-710(8) at five different stages during the rendering of the tile associated with the middle default region 710(4).

"Before pass 0" 720 includes, without limitation, the default regions 710(0)-710(8) and a traversal line 725. As shown, the traversal line 725 is the "Z-shaped" sequential order in which the parallel processing subsystem 112 processes the tiles associated with the default regions 710(0)-710(8). First, the parallel processing subsystem 112 processes the tile associated with the default region 710(0), then the tile associated with the default region 710(1), and so forth.

"During pass 0" 730 depicts a generation region 735(0) as a shaded region that is coincident with the default region 710(4). The generation region 735(0) does not lag the default region 710(4) because pass 0 is the first pass in the multi-pass sequence and, therefore, does not depend on any data from previous passes. More specifically, the pass setup 660(0) corresponding to pass 0 includes a filter 670 of (0,0), a generation offset 682 of (0,0) and an invalidation offset 686 of NULL.

"During pass 1" 750 depicts a generation region 735(1) as a shaded region that lags the default region 710(4), and a "dependencies on pass 0" 753, that includes the generation region 735(0) as well as extra pixels on all four sides. The generation region 735(1) lags the default region 710(4) because pass 1 is the second pass in the multi-pass sequence and depends on data generated during pass 0. More specifically, the pass setup 660(1) corresponding to pass 1 includes a filter 670 with the filter width 672 "w" and the filter height 674 "h", a generation offset 682 of (w,h) and an invalidation offset 686 of (2*w, 2*h).

As persons skilled in the art will recognize, the data included in the "dependencies on pass 0" 753 are generated prior to "during pass 1" 750. The "dependencies on pass 0" 753 that are located within the default region 710(4) are generated as the parallel processing subsystem 112 performs pass 0 operations on the pixels included in the default region 710(4) as depicted in the "during pass 0" 730. The "dependencies on pass 0" 753 that are located to the left and above the default region 710(4) are generated as the parallel processing subsystem 112 processes the tiles associated with the default regions 710(0), 710(1), and 710(3).

An "end of pass 1" 770 depicts an invalidation region 755(1) as a shaded region that lags both the default region 710(4) and the generation region 735(1). Notably, the invalidation region 755(1) lags the default region 710(4) by an invalidate horizontal offset 777 of double the filter width 672 and a vertical offset 779 of double the filter height 674. Based on the invalidation region 755(1), the data generated as the parallel processing subsystem 112 performs pass 0 operations on the pixels included in the default region 710(4) that are not required for the processing of subsequent tiles is flushed from the cache. By contrast, the portion of the data generated as the parallel processing subsystem 112 performs pass 0 operations on the pixels included in the default regions 710(4) that is required as the parallel processing subsystem 112 processes the tiles associated with the default regions 710(5), 710(7) and 710(8) is retained in the cache memory.

A "cumulative pass 1 data state" 790 depicts the cumulative state of the data associated with the tiles associated with the default regions 710 after iterating over the tiles associated with the default region 710(0)-710(3) and while performing the pass 1 operations on the data generation region 735(1). In particular, an "invalid pass 0 data" 795 illustrates the cumulative invalidation regions 755(1) attributable to applying the invalidation offset 686 included in the pass setup 660(1) after rendering the tiles associated with the default regions 710(0)-710(3). The "valid pass 0 data" 793 illustrates the data in the cumulative generation regions 735(0)—the data generated by the parallel processing subsystem 112 during pass 0—that remains in the cache memory.

As illustrated in FIG. 7, by using the algorithmic dependencies 610 to ensure that the generation regions 735 lag the default regions 710 and the invalidation regions 775 lag the generation regions 735, the device driver 103 optimizes data flow to and from the cache memory during multi-pass rendering sequences.

Figure 8A:
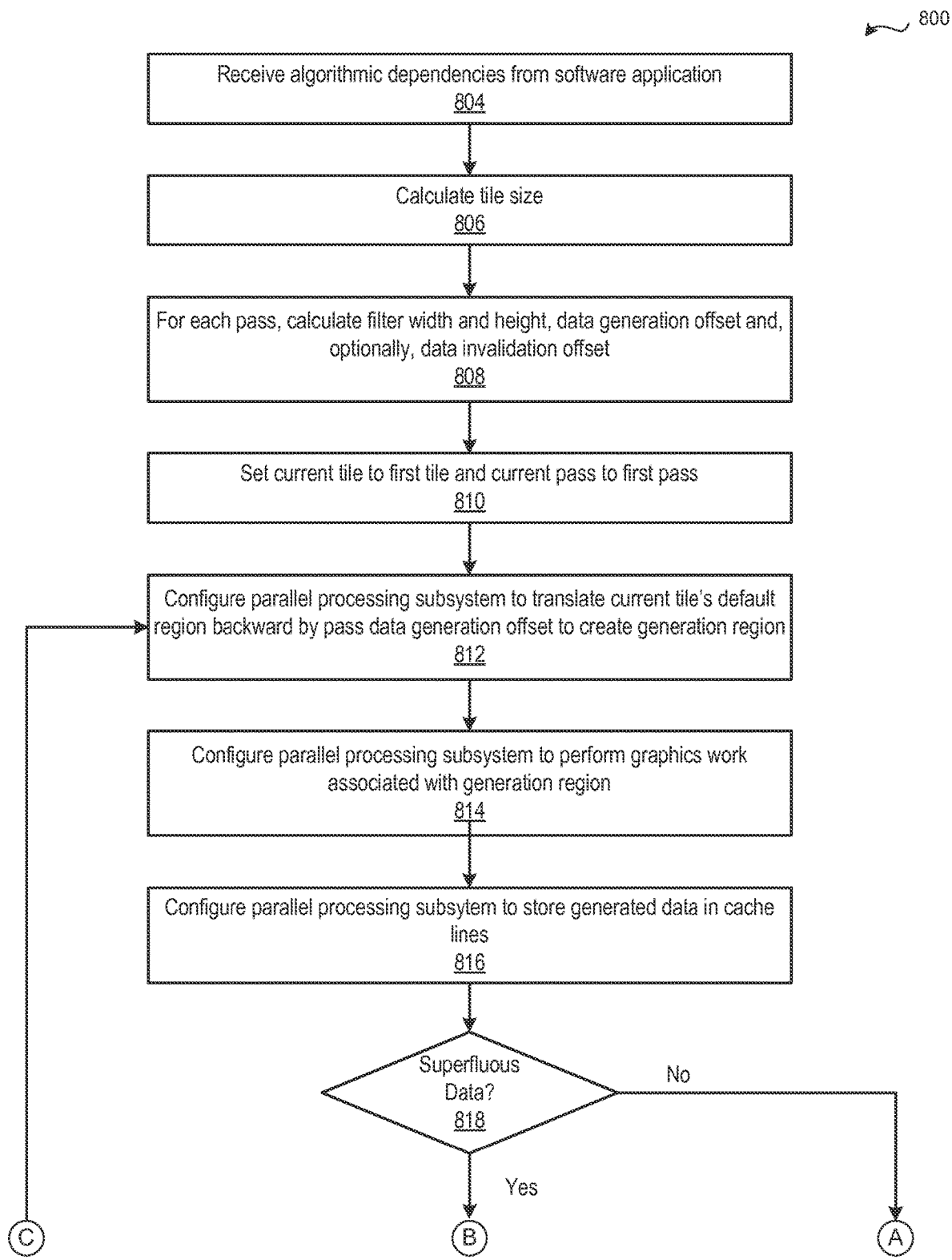
FIGS. 8A-8B set forth a flow diagram of method steps for performing a multi-pass rendering sequence in a tile-based architecture, according to one embodiment of the present invention.
Figure 8B:
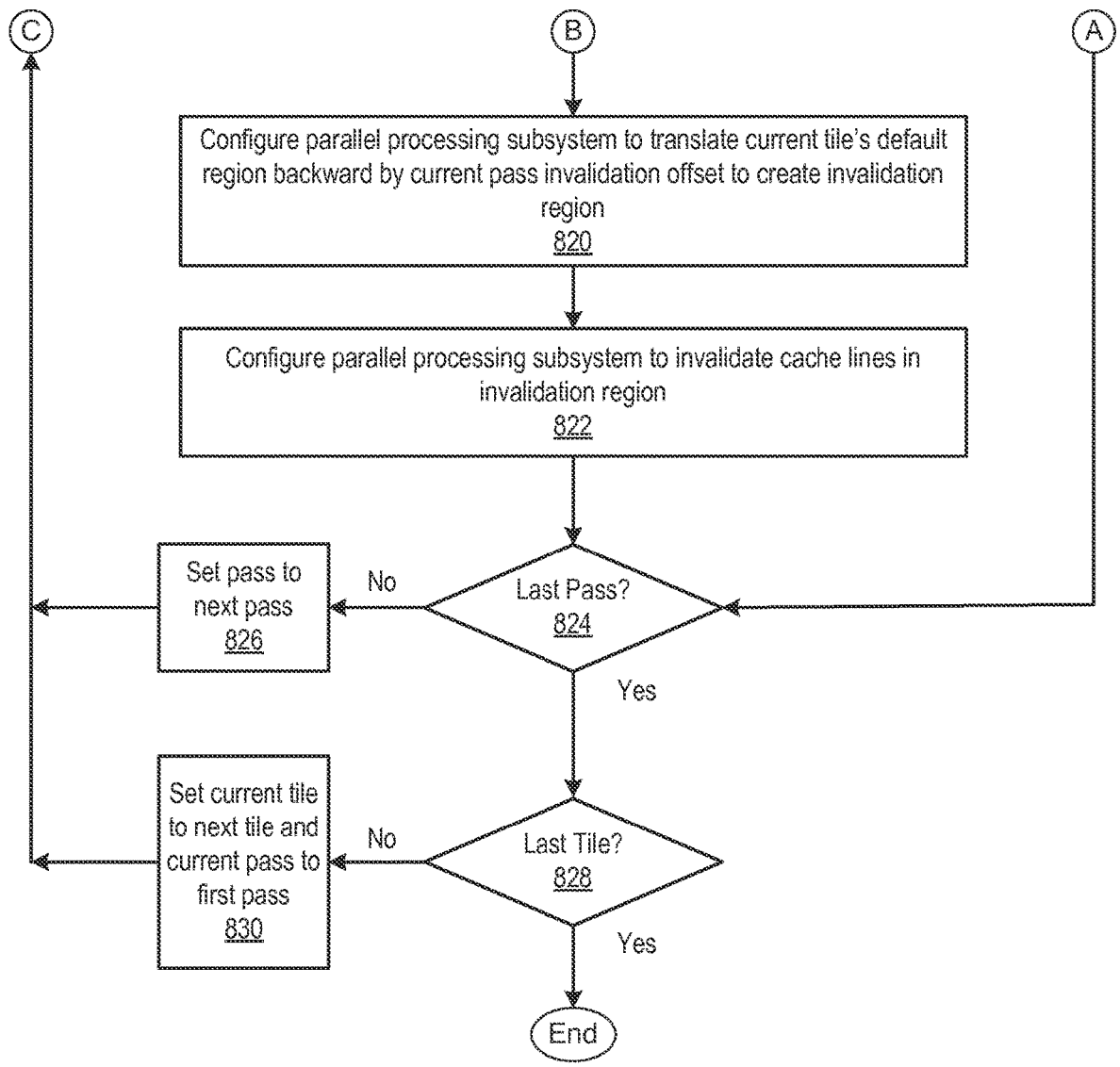

FIGS. 8A-8B set forth a flow diagram of method steps for performing a multi-pass rendering sequence in a tile-based architecture, according to one embodiment of the present invention. Although the method steps are described in conjunction with the systems of FIGS. 1-7, persons skilled in the art will understand that any system configured to implement the method steps, in any order, falls within the scope of the present invention.

As shown, a method 800 begins at step 804, where the device driver 103 receives the algorithmic dependencies 610 associated with the multi-pass rendering sequence from the software application 125. The device driver 103 may receive the algorithmic dependencies 610 in any technically feasible fashion. For example, the device driver 103 could include an API and the software application 125 could include API calls that convey the algorithmic dependencies 610 to the device driver 103. The algorithmic dependencies 610 may include any type of information in any format that enables the device driver 130 to configure the parallel processing subsystem 112 to properly and optimally execute the associated multi-pass rendering sequence.

At step 806, the device driver 103 calculates the tile size 650. In general, the device driver 103 calculates the tile size 650 based on the maximum number of byes per pixel that the multi-pass rendering sequence requires to be simultaneously resident in the cache memory and any additional constraints, such as whether the cache memory is also used to store other data. As outlined previously herein, as part of calculating the tile size 650, the device driver 103 determines the number of bytes per pixel per render target, the maximum dependency neighborhood, and the maximum pass dependency depth, At step 808, for each of the passes, the device driver 103 calculates the filter width 672, the filter height 674, the generation offset 682 and, optionally, the invalidation offset 686. More specifically, the device driver 103 sets the filter width 672 and the filter height 674 to reflect the dependency neighborhood specified by the algorithmic dependencies 610. Subsequently, for each pass, the device driver 103 sets the generation offsets 682 and the invalidation offsets 686 based on the filter width 672 and the filter height 674 associated with the pass and the filter widths 672 and the filter heights 674 associated with the previous passes that the pass is dependent upon. In alternate embodiments, the device driver 103 may calculate any number of the filter width 672, the filter height 674, the generation offset 682 and the invalidation offset 686 as-needed instead of preemptively as part of step 808.

Notably, to facilitate a tile-lag approach to multi-pass sequence rendering, for each pass, the device driver 103 sets the generation offset 682 to ensure that the data required to perform graphics operations on the pixels included in the generation region 735 is available in the cache memory prior to the pass. Similarly, for each pass, the device driver 103 sets the invalidation offset 686 to ensure that the data generated during previous passes for pixels included in the invalidation region 775 is no longer required at the end of the pass.

At step 810, the device driver 103 sets a current tile to the first tile along the traversal line 725 and a current pass to the first pass in the multi-pass sequence. At step 812, the device driver 103 configures the parallel processing subsystem 112 to translate the default region associated with the current tile in a backward direction along the traversal line 725 based on the generation offset 682 associated with the current tile. Such a translation establishes the generation region 735. The device driver 103 may configure the parallel processing subsystem 112 to perform the translation operation in any technically feasible fashion. For example, in some embodiments the device driver 103 may set a modifiable scissor rectangle that specifies whether and to what extent any graphics operations being performed by the graphics processing pipeline 350 are translated. At step 814, the device driver 103 configures the parallel processing subsystem 112 to perform graphics work to generate data in the generation region 735. More specifically, the device driver 103 configures the parallel processing subsystem 112 to execute graphics operations that are associated with the current pass as specified by the software application 125.

At step 816, the device driver 103 configures the parallel processing subsystem 112 to store generated data in cache lines. The device driver 103 may configure the parallel processing subsystem 112 to store generated data in cache lines in any technically feasible fashion. For example, in some embodiments, the device driver 103 configures the ROP 395 to store the generated data in cache lines included in the cache memory. At step 818 the device driver 103 determines whether there is superfluous data based on the invalidation offset 686. If, at step 818, the device driver 103 determines that the invalidation offset 686 is not NULL, then the device driver 103 determines that there is superfluous data, and the method 800 proceeds to step 820.

At step 820, the device driver 103 configures the parallel processing subsystem 112 to translate the default region associated with the current tile in a backward direction along the traversal line 725 based on the invalidation offset 686 associated with the current tile. Such a translation establishes the invalidation region 775. The device driver 103 may configure the parallel processing subsystem 112 to perform the translation operation in any technically feasible fashion. For example, in some embodiments the device driver 103 may appropriately relocate a modifiable scissor rectangle that specifies whether and to what extent any graphics operations being performed by the graphics processing pipeline 350 are translated. At step 822, the device driver 103 configures the parallel processing subsystem 112 to invalidate the cache lines associated with the invalidation region 775. The device driver 103 may configure the parallel processing subsystem 112 to invalidate data stored in cache lines in any technically feasible fashion. For example, in some embodiments, the device driver 103 configures the ROP 395 to invalidate the cache lines associated with the invalidation region.

If, however, at step 818, the device driver 103 determines that the invalidation offset 686 is NULL, then the device driver 103 determines that there is no superfluous data, and the method 800 proceeds directly to step 824.

At step 824, the device driver 103 determines whether the current pass is the last pass in the multi-pass rendering sequence. If, at step 824, the device driver 103 determines that the current pass is not the last pass in the multi-pass rendering sequence, then the method 800 proceeds to step 826. At step 826, the device driver 103 sets the current pass to the next pass in the multi-pass rendering sequence, and the method 800 returns to step 812, where the device driver 103 configures the parallel processing subsystem 112 to perform the graphics operations associated with the new current pass. The device driver 103 continues in this fashion, cycling through steps 812-824, until the device driver 103 has configured the parallel processing subsystem 112 to perform the graphics operations associated with all the passes in the multi-pass rendering sequence on the pixels included in the generation regions 735 associated with the current tile.

If, however, at step 824, the device driver 103 determines that the current pass is the last pass in the multi-pass rendering sequence, then the method proceeds directly to step 828. At step 828, the device driver 103 determines whether the current tile is the last tile as per the traversal line 725. If, at step 828, the device driver 103 determines that the current tile is the last tile, then the method 800 terminates. If, however, at step 828, the device driver 103 determines that the current tile is not the last tile, then the method 800 proceeds to step 830. At step 830, the device driver 103 sets the current tile to the next tile as per the traversal line 725 and the current pass to the first pass, and the method 800 returns to step 812. At step 812, the device driver 103 configures the parallel processing subsystem 112 to perform the graphics operations associated with the new current pass on the new current tile. The device driver 103 continues in this fashion, cycling through steps 812-828, until the device driver 103 has configured the parallel processing subsystem 112 to perform the graphics operations associated with all the passes in the multi-pass rendering sequence on all the tiles included along the traversal line 725.

In sum, the disclosed techniques enable a device driver to efficiently perform multi-pass rendering sequences in a cache tile architecture. In operation, prior to initiating a multi-pass rendering sequence, a device driver receives algorithmic dependencies for the multi-pass rendering sequence via an application interface. In general, the algorithmic dependencies specify the number of passes and include any number of pass dependencies between the various passes. For example, for a pass N that is the $N^{th}$ pass in the sequence, the algorithmic dependencies may include a pass dependency between the pass N and the immediately preceding pass N–1, the pass N and the pass N–2, and so forth. Each pass dependency includes a mapping that defines one or more pixels from the previous pass that are required for proper processing of each pixel during the subsequent pass. Further, each pass dependency may specify one or more pixels for which the data from the previous passes are not required for the work associated with future passes.

Based on the algorithmic dependencies, the device driver determines a per-pass filter. The per-pass filter defines the pixel data that, for optimal processing, is resident in the on-cache memory during each pass. The device driver then computes the tile size based on the per-pass filters—setting the tile size based on the maximum number of bytes per pixel that are optimally resident in the on-chip cache at any given time. Subsequently, for each pass, the device driver calculates a generation offset that is the sum of the generation offset associated with the previous pass and the current pass filter, and an invalidation offset that is the sum of the generation offset associated with the current pass and the current pass filter. As persons skilled in the art will recognize, although specific examples have been presented for purposes of illustration, the calculations that the device driver performs may vary in type and quantity without departing from the scope and spirit of the described techniques. In general, the device driver is configured to determine, without limitation, the per-pass filter, the tile size, the generation offset, and the invalidation offset based on the algorithmic dependencies.

For each tile, the device driver configures the graphics processing pipeline to generate graphics data for a set of pixels that are included in a generation region. The generation region corresponds to the default region associated with the tile translated in a backward direction along a traversal line by the generation offset. In this fashion, the device driver ensures that the data required for processing the pixels included in each generation region is available in the on-chip cache memory as the graphics processing pipeline processes the associated tile as per the traversal line. After performing the work associated with a pass, if there is data that is no longer required, then the device driver configures the graphics processing pipeline to invalidate the cache lines in an invalidation region. The invalidation region corresponds to the default region associated with the tile translated in a backward direction along the traversal line by the invalidation offset. Flushing superfluous cache lines in his manner ensures that the memory capacity of the cache memory is not exceed as the graphics processing pipeline performs subsequent work.

One advantage of the disclosed approach is that applications can fully exploit the benefits inherent in cache tiling architectures while performing arbitrarily complex multi-pass rendering sequences. More specifically, providing a flexible specification of algorithmic dependencies between passes enables the device driver to optimally configure the graphics processing pipeline to reduce memory bandwidth consumption and improve cache memory utilization while honoring data dependencies between passes. By contrast, conventional approaches to multi-pass rendering are unable to leverage the benefits of tiled caching for many multi-pass rendering scenarios.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for performing a multi-pass rendering sequence in a tile-based architecture, the method comprising:
    calculating a tile size for a current pass through a graphics processing pipeline based at least on algorithmic dependencies between the current pass and one or more previous passes through the graphics processing pipeline, wherein a given generation region is processed by the graphics processing pipeline in each pass;
    calculating a set of first generation offsets for the current pass based on a first subset of the algorithmic dependencies;
    determining a first generation region for the current pass based on the tile size and the set of first generation offsets; and
    processing the first generation region for the current pass by:
        configuring the graphics processing pipeline to generate first graphics data for a first set of pixels included in the first generation region, and
        configuring the graphics processing pipeline to store the first graphics data in a first set of cache lines included in a cache memory.

2. The computer-implemented method of claim 1, further comprising:
    calculating a set of first invalidation offsets for the current pass based on a second subset of the algorithmic dependencies;
    determining a first invalidation region for the current pass based on the first generation region and the set of first invalidation offsets; and
    configuring the graphics processing pipeline to invalidate a second set of cache lines that are associated with the first invalidation region and included in the cache memory.

3. The computer-implemented method of claim 2, further comprising:
    configuring the graphics processing pipeline to partition a screen space into a plurality of tiles based on the tile size for the current pass,
    wherein a first default region is associated with a first tile; and
    wherein determining the first invalidation region for the current pass comprises offsetting the first default region in a backward direction with respect to a traversal line based on the set of first invalidation offsets for the current pass.

4. The computer-implemented method of claim 1, further comprising:
    configuring the graphics processing pipeline to partition a screen space into a plurality of tiles based on the tile size for the current pass,
    wherein a first default region is associated with a first tile; and
    wherein determining the first generation region for the current pass comprises offsetting the first default region in a backward direction with respect to a traversal line based on the set of first generation offsets for the current pass.

5. The computer-implemented method of claim 1, wherein the algorithmic dependencies comprise a first mapping between pixels processed during a first pass and pixels processed during a second pass, wherein at least one of the first pass and the second pass are included in the one or more previous passes.

6. The computer-implemented method of claim 5, wherein the algorithmic dependencies further comprise a second mapping between the pixels processed during the second pass and pixels processed during a third pass of the graphics processing pipeline.

7. The computer-implemented method of claim 6, wherein the first mapping is different than the second mapping.

8. The computer-implemented method of claim 6, wherein the algorithmic dependencies further comprise a third mapping between the pixels processed during the first pass and the pixels processed during the third pass.

9. One or more non-transitory, computer-readable storage media including instructions that, when executed by one or more processors, cause the one or more processors to perform a multi-pass rendering sequence in a tile-based architecture, by performing the steps of:
    calculating a tile size for a current pass through a graphics processing pipeline based at least on algorithmic dependencies between the current pass and one or more previous passes through the graphics processing pipeline, wherein a given generation region is processed by the graphics processing pipeline in each pass;
    calculating a set of first generation offsets for the current pass based on a first subset of the algorithmic dependencies;

determining a first generation region for the current pass based on the tile size and the set of first generation offsets; and processing the first generation region for the current pass by:
configuring the graphics processing pipeline to generate first graphics data for a first set of pixels included in the first generation region, and
configuring the graphics processing pipeline to store the first graphics data in a first set of cache lines included in a cache memory.

10. The one or more non-transitory, computer-readable storage media of claim 9, further including instructions that, when executed by the one or more processors, cause the one or more processors to further perform the steps of:
calculating a set of first invalidation offsets for the current pass based on a second subset of the algorithmic dependencies;
determining a first invalidation region for the current pass based on the first generation region and the set of first invalidation offsets; and
configuring the graphics processing pipeline to invalidate a second set of cache lines that are associated with the first invalidation region and included in the cache memory.

11. The one or more non-transitory, computer-readable storage media of claim 10, further including instructions that, when executed by the one or more processors, cause the one or more processors to further perform the step of:
configuring the graphics processing pipeline to partition a screen space into a plurality of tiles based on the tile size for the current pass,
wherein a first default region is associated with a first tile; and
wherein determining the first invalidation region for the current pass comprises offsetting the first default region in a backward direction with respect to a traversal line based on the set of first invalidation offsets for the current pass.

12. The one or more non-transitory, computer-readable storage media of claim 9, further including instructions that, when executed by the one or more processors, cause the one or more processors to further perform the step of:
configuring the graphics processing pipeline to partition a screen space into a plurality of tiles based on the tile size for the current pass,
wherein a first default region is associated with a first tile; and
wherein determining the first generation region for the current pass comprises offsetting the first default region in a backward direction with respect to a traversal line based on the set of first generation offsets for the current pass.

13. The one or more non-transitory, computer-readable storage media of claim 12, wherein the set of first generation offsets for the current pass comprises:
a horizontal offset; and
a vertical offset that is not equal to the horizontal offset.

14. The one or more non-transitory, computer-readable storage media of claim 12, wherein the set of first generation offsets for the current pass comprises at least one of:
a first filter width; and
a first filter height.

15. The one or more non-transitory, computer-readable storage media of claim 9, wherein the algorithmic dependencies comprise a first mapping between pixels processed during a first pass and pixels processed during a second pass, wherein at least one of the first pass and the second pass are included in the one or more previous passes.

16. The one or more non-transitory, computer-readable storage media of claim 15, wherein the algorithmic dependencies further comprise a second mapping between the pixels processed during the second pass and pixels processed during a third pass of the graphics processing pipeline.

17. A system configured to perform a multi-pass rendering sequence, the system comprising:
a graphics processing pipeline that implements a tile-based architecture; and
a device driver coupled to the graphics processing pipeline that:
calculates a tile size for a current pass through the graphics processing pipeline based at least on algorithmic dependencies between the current pass and one or more previous passes through the graphics processing pipeline, wherein a given generation region is processed by the graphics processing pipeline in each pass,
calculates a set of first generation offsets for the current pass based on a first subset of the algorithmic dependencies,
determines a first generation region for the current pass based on the tile size and the set of first generation offsets, and
processes the first generation region for the current pass by:
configuring the graphics processing pipeline to generate first graphics data for a first set of pixels included in the first generation region, and
configuring the graphics processing pipeline to store the first graphics data in a first set of cache lines included in a cache memory.

18. The system of claim 17, wherein the device driver further:
calculates a set of first invalidation offsets for the current pass based on a second subset of the algorithmic dependencies,
determines a first invalidation region for the current pass based on the first generation region and the set of first invalidation offsets, and
configures the graphics processing pipeline to invalidate a second set of cache lines that are associated with the first invalidation region and included in the cache memory.

19. The system of claim 18, wherein the device driver further:
configures the graphics processing pipeline to partition a screen space into a plurality of tiles based on the tile size for the current pass,
wherein a first default region is associated with a first tile; and
wherein determining the first invalidation region for the current pass comprises offsetting the first default region in a backward direction with respect to a traversal line based on the set of first invalidation offsets for the current pass.

20. The system of claim 17, wherein the device driver further:
configures the graphics processing pipeline to partition a screen space into a plurality of tiles based on the tile size for the current pass,
wherein a first default region is associated with a first tile; and wherein determining the first generation region for the current pass comprises offsetting the first default region in a backward direction with respect to a traversal line based on the set of first generation offsets for the current pass.

* * * * *